US012735527B2

(12) United States Patent
Lemoine et al.

(10) Patent No.: US 12,735,527 B2
(45) Date of Patent: Sep. 15, 2026

(54) LOW DENSITY FLAME RETARDANT TWO-COMPONENT COMPOSITION FOR STRUCTURAL VOID FILLING

(71) Applicant: Zephyros, Inc., Romeo, MI (US)

(72) Inventors: Olivier Lemoine, Molsheim Cedex (FR); Morgane Winkler, Molsheim Cedex (FR); Nathalie Parent, Molsheim Cedex (FR); Michel Awkal, Molsheim Cedex (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 17/800,557

(22) PCT Filed: Feb. 17, 2021

(86) PCT No.: PCT/EP2021/053863

§ 371 (c)(1),
(2) Date: Aug. 18, 2022

(87) PCT Pub. No.: WO2021/165304

PCT Pub. Date: Aug. 26, 2021

(65) Prior Publication Data

US 2023/0092362 A1 Mar. 23, 2023

(30) Foreign Application Priority Data

Feb. 18, 2020 (EP) .................................... 20157920

(51) Int. Cl.
*C08G 59/54* (2006.01)
*C08K 3/32* (2006.01)
*C08L 63/04* (2006.01)

(52) U.S. Cl.
CPC ................ *C08G 59/54* (2013.01); *C08K 3/32* (2013.01); *C08L 63/04* (2013.01); *C08K 2003/323* (2013.01)

(58) Field of Classification Search
CPC combination set(s) only.
See application file for complete search history.

(56) References Cited

U.S. PATENT DOCUMENTS 4,347,334 A 8/1982 Staendeke et al.
4,372,717 A 2/1983 Sewell et al.
4,467,056 A 8/1984 Staendeke et al.
4,514,328 A 4/1985 Staendeke et al.
4,639,331 A 1/1987 Elsner et al.
5,132,156 A 7/1992 Trassare, Jr. et al.
2011/0220267 A1 9/2011 Blancaneaux et al.
2012/0048451 A1 3/2012 Carlson et al.
2012/0177877 A1 7/2012 Lebail et al.
2013/0171407 A1 7/2013 Franzoi et al.
2014/0083596 A1 3/2014 Walker
2015/0284563 A1* 10/2015 Beck ...................... C08G 59/22 523/400
2017/0218237 A1 8/2017 Elgimiabi et al.
2018/0037695 A1 2/2018 Czaplicki
2018/0215967 A1 8/2018 Walker
2021/0395478 A1 12/2021 Czaplicki
2022/0025172 A1 1/2022 Czaplicki
2022/0089859 A1 3/2022 Czaplicki
2024/0287246 A1 8/2024 Czaplicki

FOREIGN PATENT DOCUMENTS

EP 2818490 A1 12/2014
JP 1998101836 A 9/1996
JP 2001081223 A 3/2001
WO 2016/148938 A1 9/2016
WO 2018/167062 A1 9/2018
WO 2019/170747 A1 9/2019

OTHER PUBLICATIONS

PCT International Preliminary Report on Patentability dated Aug. 23, 2022 (Application No. PCT/EP2021/053863).
PCT Search Report & Written Opinion dated May 14, 2021, Application No. PCT/EP2021/053863.
Japanese 1st Office Action dated Mar. 2, 2023 (Application No. 2021-523472).
Japanese 2nd office action dated Nov. 17, 2023 (Application No. 2021-523472).

* cited by examiner

*Primary Examiner* — Megan Mcculley
(74) *Attorney, Agent, or Firm* — The Dobrusin Law Firm, P.C.

(57) ABSTRACT

The invention relates to a low density two-component structural void filling composition that is preferably based on epoxy chemistry. It is designed for use on interior honeycomb sandwich structures as edge close-out and corner reinforcement, as well as local reinforcement for mechanical fixation or complex gap filling. The composition is compatible with metal and non-metal constructions that are typically found in aircraft interiors. The cured material has excellent fire, smoke and toxicity properties. Further, the composition has excellent processing attributes due to easy storage, handling, extrudability, filling, grinding, and painting abilities.

18 Claims, No Drawings

LOW DENSITY FLAME RETARDANT TWO-COMPONENT COMPOSITION FOR STRUCTURAL VOID FILLING

Priority is claimed of European patent application no. 20 157 920.8, filed on Feb. 18, 2020.

The invention relates to a low density two-component structural void filling composition that is preferably based on epoxy chemistry. It is designed for use on interior honeycomb sandwich structures as edge close-out and corner reinforcement, as well as local reinforcement for mechanical fixation or complex gap filling. The composition is compatible with metal and non-metal constructions that are typically found in aircraft interiors. The cured material has excellent fire, smoke and toxicity properties. Further, the composition has excellent processing attributes due to easy storage, handling, extrudability, filling, grinding, and painting abilities.

BACKGROUND ART

There is an ongoing need in many industries (e.g., transportation, such as in marine craft, rail cars, automotive vehicles, aircraft, or otherwise; building construction) for improved compositions that exhibit flame retardancy, ease of use, relatively good performance for their intended purposes, and/or reduction in the number of steps needed for processing the compositions for their intended use. Examples of such applications include adhesive or other compositions for use in potting, edge close-out, local reinforcement, and/or core splices of one or more bodies, such as a body having hollow sections, cavities, and/or void-containing structures. One such body is a honeycomb structure panel of a type commonly employed in aerospace applications.

While many existing compositions meet some of the above needs, there continues to be a need for improved materials that simplify manufacture and/or use of the compositions, which help reduce the amount of such compositions that are needed, or that meet some other need. There is especially a need for additional materials that offer an appropriate balance of viscosity (e.g. to allow for filling of cavities, or other voids, or to otherwise permit ready ability for handling during its working life), and good resulting strength and/or modulus characteristics (e.g. in compression) upon cure.

U.S. Pat. No. 4,372,717 relates to an expandable honeycomb slab constructed from sheet material of corrugated paperboard, for filling load voids within a container carrying articles of freight.

U.S. Pat. No. 5,132,156 discloses a void filler especially suited for filling large volumes is made from first and second panels, each panel having a core sandwiched between face sheets. The core is typically a corrugated honeycomb core so that the panel is stiff, strong and yet light-weight.

US 2011 0220267 relates to inserts such as screw threaded receivers that are provided with an activatable adhesive so they can be inserted into a cavity of an article of manufacture and the adhesive activated to secure the insert within the article US 2012 0048451 discloses a panel structure and a method of forming the panel structure. The panel structure typically includes at least one panel associated with a material.

US 2012 0177877 relates to laminar structures comprising two facing panels separated by a honeycomb structure containing foamed elastomeric material in the cells provide a combination of sound insulation and fire retardancy in a compact light-weight foam which can be produced using traditional manufacturing techniques.

US 2013 0171407 discloses a panel assembly and method of making the same, whereby the panel assembly includes an adhesive located onto one or more edges of a layered honeycomb structure and a mesh material adhered in between the layered honeycomb structure by the adhesive.

US 2014 0083596 relates to a method for manufacturing foam core materials comprising locating into a mold a solid activatable material, the activatable material being amenable to plastic deformation and pliable enough to take on the general contours and shape of the mold prior to activation of the activatable material.

US 2017 0218237 relates to curable compositions including room temperature liquid epoxy resin, epoxy curing agent, thermoplastic resin, and a physical blowing agent which are, in some embodiments, useful as core splice film adhesives and which are said to be in some embodiments fire retardant.

US 2018 0215967 discloses a one-part epoxy-based adhesive paste composition, comprising: at least 20% by weight of a liquid epoxy resin component; an amount of a halogen-free flame retardant sufficient so that the resulting cured adhesive composition exhibits sufficient flame retardancy for a vertical burn length of less than 6 inches according to FAR 25,853; at least two curing agents; and a light-weight low-density filler.

WO 2016/148938 discloses nozzles for application of a setting resin into cells of a honeycomb core to provide the panel with reinforced segments. The nozzle comprises a connector portion and an application head, where the connector portion is adapted to receive setting resin from a resin dispensing device and deliver the setting resin to the application head, and the application head comprises: an exit hole, and a flange surrounding the exit hole.

WO 2018/167062 relates to a panel structure that incorporates one or more panels and a material for providing reinforcement, baffling, sealing, sound absorption, damping or attenuation, thermal insulation, combinations thereof or the like.

WO 2019/170747 discloses a heat-activatable foamable honeycomb core splice adhesive having improved fire retardancy, particularly with respect to smoke toxicity and smoke opacity (smoke density).

EP 2 818 490 relates to curable compositions comprising (i) at least one epoxy resin comprising at least one aromatic moiety or a moiety derivable by hydrogenating an aromatic moiety and wherein the epoxy resin does not contain an aromatic amine moiety, (ii) an epoxide hardener system comprising (a) a carboxylic acid anhydride, (b) a first amine having a melting point from about 30° C. to about 100° C. and containing at least one primary amine group; and (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride; (iii) a filler capable of reducing the density of the curable composition and, optionally, (iv) a fire-retardant system that includes a mixture of: (a) at least one compound selected from the group comprising alkaline earth metal hydroxides and aluminium group hydroxides, and (b) at least one phosphorous-containing material, furthermore, cured compositions obtainable by curing the above curable composition, the use of the curable composition for filling of voids in honeycomb structures and processes for filing voids in honeycomb structures.

Rigorous fire regulations are imposed on materials used in the transportation industries and in particular on materials used in aircraft. Reduced flammability, fire retardancy, reduction in smoke density, reduction in smoke toxicity, low heat release on burning are important for materials that are used in transportation vehicles. In particular, materials that are used inside the pressurized section of the fuselage of an aircraft should comply with the requirements of the Federal Aviation Authority (FAA) tests for fire, smoke and toxicity FAR Part 25.sctn.25.853 (a) and heat release FAR Part 25.sctn.25.853 (d).

The use of various flame retardants (fire retardants) and combinations thereof is also known from the prior art. Known flame retardants includes halogenated polymers, other halogenated materials, materials (e.g. polymers) including red phosphorous, bromine, chlorine, oxide, combinations thereof or the like. Exemplary flame retardants include, without limitation, chloroalkyl phosphate, dimethyl methylphosphonate, bromine-phosphorus compounds, neopentylbromide polyether, brominated polyether, antimony oxide, zinc borate, calcium metaborate, chlorinated paraffin, brominated toluene, hexabromobenzene, antimony trioxide, graphite (e.g. expandable graphite), combinations thereof or the like.

Further, strict health and environmental protection regulations are imposed on materials used in the transportation industries and in particular on materials used in aircraft. Thus, it can accordingly be detrimental if these materials contain constituents that are classified as e.g. causing skin irritation (H315), potentially causing an allergic skin reaction (H317), causing serious eye damage (H318), causing serious eye irritation (H319), being harmful if inhaled (H332), potentially causing allergy or asthma symptoms or breathing difficulties if inhaled (H334), being very toxic to aquatic life (H400), being harmful to aquatic life with long lasting effects (H411 or H412), and the like. These risks become even worse when one must consider situations where such materials are exposed to heavy fires.

For example, red phosphorus (CAS 7723-14-0) is considered fatal if inhaled, causes severe skin burns and eye damage, is very toxic to aquatic life and catches fire spontaneously if exposed to air. Further, combustion by-products of red phosphorous include highly toxic phosphine gas. Zinc borate (CAS 1332-07-6) is even suspected of damaging fertility or the unborn child.

Likewise, some curing agents like 1,2,3,6-tetrahydromethyl-3,6-methanophthalic anhydride (CAS 25134-21-8) are considered harmful if swallowed, causes serious eye damage, causes skin irritation, may cause an allergic skin reaction and may cause allergy or asthma symptoms or breathing difficulties if inhaled.

Furthermore, it is desirable to provide structural void filling compositions that are stored in cartridge systems or other containers suitable for ready to use in compatible dispensing systems. The cartridges are then loaded into the compatible dispensing systems. For the purpose of dispensing the structural void filling composition from the cartridge, a force is transiently exerted to the composition so that it begins to flow and exits the cartridge system or dispensing device through a nozzle or other suitable orifice. It is typically desirably not to use the full content of the structural void filling composition that is contained in a cartridge all at once. On the contrary, it is desirable to use only a portion of the structural void filling compositions, i.e. to interrupt the dispensing process, and after a certain while, upon demand, typically after minutes, hours, days or even weeks, to continue with the dispensing process until finally the full content of the structural void filling composition that was contained in a cartridge has been consumed.

While this is comparatively easy to achieve with one-component systems, special problems arise with two-component systems, i.e. systems, that are activated upon mixing and do not require any additional external stimulus for inducing cure. Cartridges are on the market that have separate chambers, a first chamber in which the first component is stored, and a second chamber in which the second component is stored. In this original state, i.e. before first use, storage stability of the separate components in the separate chambers is excellent. For the purpose of dispensing the structural void filling composition from the cartridge, a force is transiently exerted to the first component in the first chamber and also to the second component in the second chamber, so that they both begin to flow. The moving strands are then mixed with one another in a suitable mixing tool that is typically located at the head of the cartridge, and subsequently a strand of the mixed structural void filling composition comprising both, the first component and the second component, exits the cartridge system or dispensing device through a nozzle or another suitable orifice. As the curing process is initiated upon mixing the first component with the second component, it must be ensured that none of the mixture remains in the cartridge system. To avoid occlusions, mixing is typically achieved immediately before the composition exits the cartridge and the volume of the mixing chamber of the mixing tool is typically minimized.

Special problems arise when the two-components of the structural void filling composition have a low density and are compressible to a certain extent such that they reduce their volume when an external force is applied, e.g. within the chamber of a cartridge. It has been observed that such compositions can be easily dispensed from the cartridge upon exerting a force for the first time. However, when the dispensing process is to be interrupted, i.e. when the exerting of a force is stopped, the thus compressed components evolve a restoring force due to expansion of the compressed material to its original volume. Such expansion may cause an undesirable backflow of the first component into the second chamber where the second component is stored, and vice versa. In consequence, the first component in the first chamber is mixed with backflowing second component, and the second component in the second chamber is mixed with backflowing first component, respectively. Such mixing will inevitably induce curing of the mixed material and thus finally lead to occlusions.

Such mixing is typically not avoided by commercially available cartridges because they are typically not equipped with valves. In consequence, such two-component structural void filling compositions have an unsatisfactory in-use storage stability, but rather need to be consumed in their entirety once a fresh cartridge is being used.

The structural void filling compositions of the prior art are therefore not satisfactory in every respect and there is a demand for improved structural void filling compositions. In particular, the structural void filling compositions should be curable at room temperature and should have lower density, improved health safety environment (HSE) profiles, faster curing times or sanding times, improved compressive strength at elevated temperatures, improved compressive strength after wet aging, lower fluid absorption, or any combination of the foregoing.

It is an object of the invention to provide structural void filling compositions having improved properties compared to the structural void filling compositions of the prior art. The structural void filing compositions should

- be processable at room temperature, i.e. should not require any external stimulus for inducing curing such as heat, UV light, humidity, and the like;
- should be applicable by cartridge or other dispensing systems, i.e. should be extrudable or pumpable in the uncured state, and provide satisfactory in-use storage stability;
- should provide satisfactory open times, i.e. should allow sufficient time for application to substrates but should not require extended periods of time until full cure;
- have good mechanical properties e.g. in terms of compressive strength and compressive modulus;
- should have low density; and
- should have excellent pyrolytic properties, e.g. in terms of smoke density, smoke toxicity, and the like.

This object has been achieved by the subject-matter of the patent claims.

SUMMARY OF THE INVENTION

A first aspect of the invention relates to a two-component system of a

- (i) first component comprising one or more curable polymers; preferably one or more curable epoxy resins; and
- (ii) a second component comprising one or more curing agents for the one or more curable polymers; preferably one or more curing agents for the one or more curable epoxy resins;

wherein the first component and/or the second component additionally comprise

- an ammonium polyphosphate;
- a metal hydroxide; and
- a filler selected from the group consisting of polymeric microspheres, hollow glass microspheres, and thixotropic fillers;

wherein the first component and the second component are spatially separated from one another; and wherein the reaction of the first component and the second component at 23° C. after mixing with one another results in a cured material.

It has been surprisingly found that specific combinations of compounds provide fire retardants providing the two-component systems with improved fire retardancy, especially with respect to smoke toxicity and/or smoke opacity (optical smoke density), and additionally may impart the two-component system its paste-like consistency prior to cure.

Further, it has been surprisingly found that when properly adjusting densities and rheological properties, the first component and the second component of two-component structural void filling compositions can be separately provided in separate chambers of cartridges or dispensing systems having improved in-use storage stability, as undesired mixing upon backflow can be avoided.

Still further, it has been surprisingly-found that two-component structural void filling compositions can be provided that in comparison to conventional commercial two-component systems have a lower density at comparable mechanical properties; that have a high stability with respect to aging; that have a better smoke density; and have a significantly improved overall HSE profile.

Furthermore, it has been surprisingly found that two-component structural void filling compositions can be provided that in comparison to conventional commercial two-component systems have a better time window for processing, especially with respect due to a faster curing time to full cure and a shorter sanding time.

DETAILED DESCRIPTION OF THE INVENTION

The system according to the invention is a two-component system. For the purpose of the specification, the first component and the second component of the two-component system according to the invention are stored in a state where they are spatially separated from one another, e.g. in two separate chambers of a cartridge system. Unless being mixed with one another, the two-components may be stored for extended periods of time, e.g. several months or years.

The first component and the second component of the two-component system according to the invention are to be mixed with one another shortly before application. The properties of the first component and the second component are specifically adjusted and designed so that the first component and the second component are compatible with one another, can be easily mixed with one another, and upon mixing begin to react with one another.

In particular, upon mixing the first component with the second component, the one or more curable polymers of the first component begin to react with the one or more curing agents for the one or more curable polymers of the second component. However, the curing rate is specifically adjusted so that on the one hand curing occurs not too quickly in order to allow for application of the combined two-component system in the still uncured state. On the other hand, curing occurs not too slowly so that after application of the combined two-component system to a substrate further processing steps may be conducted without requiring intermediate storage for extended periods of time.

Reaction of the first component with the second component occurs spontaneously upon mixing. No external stimulus is required for inducing curing. The reaction of the first component and the second component at 23° C. after mixing with one another results in a cured material. Thus, for the purpose of the specification, three different states of the two-component system according to the invention may be distinguished: (i) prior to mixing of the first and second component (uncured state); (ii) shortly after mixing of the first and second component (reactive state, curing ongoing); and (iii) after curing (cured state).

From a chemical standpoint, the two-component system is usually initially processed as a thermoplastic material before curing in its reactive state. After curing, the two-component system preferably becomes a thermoset material that is fixed and incapable of any substantial flow. It is also contemplated that the two-component system may comprise fibers such as glass fibers, carbon fibers or polyamide fibers such as aramid fibers.

Although the two-component system is preferably activated by mixing the two-components with one another at room temperature, it may be otherwise additionally activated by other stimuli to cure, bond, combinations thereof or the like. Without limitation, such two-component system may be activated by alternative stimuli such as, heat, pressure, moisture, chemicals, ultraviolet radiation, electron beam, induction, electromagnetic radiation or by other ambient conditions.

Preferably, the separate components of the two-component system according to the invention are not adhesive in the meaning of ASTM D907, whereas after mixing with one another, the two-component system according to the invention is preferably rendered adhesive in the meaning of ASTM D907.

Preferably, upon activation by mixing the first component with the second component, the two-component system according to the invention preferably exhibits no shrinkage. Thus, the total volume of the mixture of the first component and the second component immediately after mixing essentially corresponds to the total volume of the mixture after full cure. In quantitative terms, the relative difference of the total volume of the two-component system prior to cure and after cure is at most ±1.0 vol.-%; more preferably at most ±0.5 vol.-%; still more preferably at most ±0.1 vol.-%.

Preferably, the first component and the second component both are extrudable through cartridge systems or dispensing systems.

Preferably, the separate components of the two-component system according to the invention each have the consistency of a paste, i.e. a semisolid material. For the purpose of the invention, a paste is generally regarded as a substance that behaves as a solid until a sufficiently large load or stress is applied, at which point it flows like a fluid. In rheological terms, a paste is an example of a Bingham plastic fluid. Pastes typically consist of a suspension of granular material in a background fluid. The individual grains are jammed together, forming a disordered, glassy or amorphous structure, and giving pastes their solid-like character. Thus, by definition, the two-component system according to the invention is not a liquid.

Preferably, the viscosity of the paste is within the range of from about 50 to 300 Pa·s, preferably about 75 to 275 Pa·s, more preferably about 100 to 250 Pa·s, still more preferably about 125 to 225 Pa·s, and yet more preferably about 150 to 200 Pa·s; in each case determined according to ASTM D445.

Preferably, the first component and the second component independently of one another both have a specific gravity (uncured density) determined by the method according to EN ISO 1183 of not more than 0.7100 $g \cdot cm^{-3}$. According to the general knowledge in the art, the term "uncured density" typically refers to the density prior to activation (sometimes also referred to as "green state density").

Preferably, the first component and the second component independently of one another both have a specific gravity (uncured density) of at most 0.680 $g \cdot cm^{-3}$, more preferably of at most 0.673 $g \cdot cm^{-3}$, still more preferably of at most 0.660 $g \cdot cm^{-3}$, even more preferably of at most 0.658 $g \cdot cm^{-3}$, yet more preferably of at most 0.653 $g \cdot cm^{-3}$ and in particular of at most 0.620 $g \cdot cm^{-3}$; in each case determined according to EN ISO 1183.

Preferably, the first component and the second component independently of one another both have a specific gravity (uncured density) of at most 0.600 $g \cdot cm^{-3}$, more preferably of at most 0.590 $g \cdot cm^{-3}$, still more preferably of at most 0.580 $g \cdot cm^{-3}$, even more preferably of at most 0.570 $g \cdot cm^{-3}$, yet more preferably of at most 0.560 $g \cdot cm^{-3}$ and in particular of at most 0.550 $g \cdot cm^{-3}$; in each case determined according to EN ISO 1183.

Preferably, the first component and the second component independently of one another both have a specific gravity (uncured density) within the range of 0.54±0.25 $g \cdot cm^{-3}$; preferably 0.54±0.20 $g \cdot cm^{-3}$; more preferably 0.54±0.15 $g \cdot cm^{-3}$; still more preferably 0.54±0.10 $g \cdot cm^{-3}$; most preferably 0.54±0.05 $g \cdot cm^{-3}$; in each case determined according to EN ISO 1183.

Preferably, the relative difference of the specific gravity (uncured density) of first component and the specific gravity of the second component is at most ±0.10 $g \cdot cm^{-3}$; preferably at most ±0.05 $g \cdot cm^{-3}$; in each case determined according to EN ISO 1183.

Prior to first use, the two-component system according to the invention is storage stable under ambient conditions (e.g. 23° C. and 50% r.h.). Thus, the two-component system according to the invention may be stored under ambient conditions without being activated prematurely. Preferably, the two-component system according to the invention is storage stable under ambient conditions for at least one month, preferably at least six months, more preferably at least one year. It is contemplated that the two-component system according to the invention may be stored at low temperatures (e.g. 4° C. or −18° C.). However, storage at room temperature is typically sufficient.

After the first use and before the last use, the two-component system according to the invention when being contained in a conventional cartridge system is in-use storage stable under ambient conditions (e.g. 23° C. and 50% r.h.). Preferably, the two-component system according to the invention is in-use storage stable under ambient conditions for at least one month, preferably at least six months, more preferably at least one year. Preferably, various portions of the two-component system by be consecutively dispensed from the cartridge with intermediate breaks of hours, days, weeks or months.

For the purpose of the specification, in-use storage stability refers to the stability within a cartridge system after a portion of the two-component system has been dispensed from the cartridge for the first time, whereas the remainder is to be dispensed from the cartridge in future still in its uncured state. The cartridge has two separate chambers, the first chamber containing the first component, the second chamber containing the second component.

The first component of the two-component system according to the invention comprises one or more curable polymers.

The one or more curable polymers are capable of reacting with the one or more curing agents for the one or more curable polymers, wherein reaction typically takes place at room temperature. Thus, the one or more curable polymers typically comprise reactive functional groups that are capable of reacting with compatible reactive functional groups of the one or more curing agents under suitable reaction conditions. Typically, the reaction of the one or more curable polymers with the one or more curing agents causes cross-linking thereby rendering the two-component system a thermoset material.

The one or more curable polymers may consist of a single curable polymer or a mixture of two or more curable polymers that are capable of reacting with the one or more curing agents. It is also contemplated that the two-component system comprises two curable polymers and two curing agents, wherein a first curable polymer is capable of reacting with a first curing agent, whereas a second curable polymer is capable of reacting with a second curing agent without interference of the two curing reactions. Such a system after cure may then result in an interpenetrating polymer network.

Typically, the entire amount of the one or more curable polymers that is contained in the two-component system is contained in the first component, because otherwise premature reaction with the ingredients of the second component upon storage could hardly be avoided.

The one or more curable polymers may be such that the composition of the invention exhibits, when cured, one or any combination of a relatively high compressive strength, a relatively high compressive modulus, all while exhibiting acceptable flame retardancy and a relatively low density.

The one or more curable polymers may include a variety of different polymers, independently of one another selected from the group consisting of functionalized thermoplastics, elastomers, plastomers combinations thereof or the like. For example, and without limitation, polymers that might be appropriately incorporated into the first component of the two-component system include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terephthalates, acetates (e.g. EVA), acrylates, methacrylates (e.g. ethylene methyl acrylate polymer) or mixtures thereof.

Further, curable polymer may include a variety of different polymers, independently of one another selected from the group consisting of functionalized polyolefins (e.g., polyethylene, polypropylene), polystyrenes, polyacrylates, poly(ethylene oxides), poly(ethyleneimines), polyesters, polyurethanes, polysiloxanes, polyethers, polyphosphazines, polyamides, polyimides, polyisobutylenes, polyacrylonitriles, poly(vinyl chlorides), poly(methyl methacrylates), poly(vinyl acetates), poly(vinylidene chlorides), polytetrafluoroethylenes, polyisoprenes, polyacrylamides, polyacrylic acids, and/or polymethacrylates.

Preferably, the one or more curable polymers of the first component comprise or essentially consist of one or more curable epoxy resins. In a particularly preferred embodiment, the one or more curable polymers comprise or essentially consists of two epoxy resins.

For the purpose of the specification, "essentially consisting of" something means consisting to at least 95 wt.-% of said something; preferably at least 98 wt.-% of said something; more preferably at least 99 wt.-% of said something.

Epoxy resin is used herein to mean any of the conventional dimer, oligomer or polymer containing at least one epoxy functional group. The one or more epoxy resins may have one or more oxirane rings reactive by a ring opening reaction. It is contemplated that the two-component system can include up to 80 wt.-% of one or more epoxy resins, relative to the total weight of the two-component system. Preferably, the two-component system includes from 10 to 70 wt.-% one or more epoxy resins; and still more preferably from 30 wt.-% to 60 wt.-% one or more epoxy resins; in each case relative to the total weight of the two-component system.

The one or more epoxy resins may be independently of one another aliphatic, cycloaliphatic, aromatic or the like. The one or more epoxy resins may independently of one another be supplied as a solid (e.g., as pellets, chunks, pieces or the like) or a liquid (e.g., an epoxy resin). The one or more epoxy resins may independently of one another include an ethylene copolymer or terpolymer that may possess an alpha-olefin. As a copolymer or terpolymer, the polymer is composed of two or three different monomers, i.e. small molecules with high chemical reactivity that are capable of linking up with similar molecules. One exemplary epoxy resin may be a phenolic resin, which may be a novolac type or other type resin. Other preferred epoxy resins contained in the first component of the two-component system according to the invention may include a bisphenol-A epichlorohydrin ether polymer, or a bisphenol-A epoxy resin which may be modified with butadiene or another polymeric additive.

In preferred embodiments, the two-component system contains no epoxy resin other than room temperature liquid epoxy resin.

Preferably, the two-component system may comprise up to 85 wt.-% or greater of one or more curable polymers, relative to the total weight of the two-component system. Preferably, the two-component system comprises 0.1 wt.-% to 85 wt.-%, more preferably 1 wt.-% to 70 wt.-% of one or more curable polymers, in each case relative to the total weight of the two-component system.

Preferably, the total content of the one or more curable polymers, preferably the one or more curable epoxy resins, of the first component is within the range of 45±30 wt.-%, preferably 45±25 wt.-%, more preferably 45±20 wt.-%, still more preferably 45±15 wt.-%, yet more preferably 45±10 wt.-%, most preferably 45±5.0 wt.-%, relative to the total weight of the two-component system.

When the two-component system according to the invention contains two or more curable polymers, the total content refers to the total amount of all curable polymers that are contained in the two-component system.

Preferably, the one or more curable polymers of the first component comprise a liquid epoxy resin; preferably a liquid bisphenol diglycidylether; more preferably a liquid bisphenol A diglycidylether. For the purpose of the specification, liquid epoxy resins are liquid at room temperature (i.e. at 23° C.).

Preferably, the liquid epoxy resin has an epoxy equivalent weight within the range of from 160 to 215 g/eq; preferably from 175 to 200 g/eq, and more preferably from 182 to 192 g/eq; in each case determined according to ASTM D1652. The liquid epoxy resin may have a maximum epoxy equivalent weight of at least 250 grams/equivalent per ASTM D1652.

The liquid epoxy resin may have a viscosity (at 25° C., per ASTM D445) in the range of 1000 to 10,000 Centipoise (mPa·s), e.g., 4,000 to 7,000 mPa·s.

Any suitable epoxy resin that is liquid at room temperature may be used in the two-component system according to the invention. In preferred embodiments, the liquid epoxy resin is a neat room temperature liquid epoxy resin, i.e. it is a liquid at room temperature without addition of solvents or reactive diluents. In preferred embodiments, the liquid epoxy resin is an epoxy resin mixed with a reactive diluent such that it is a liquid at room temperature, i.e. an epoxy/reactive diluent room temperature liquid epoxy resin. In preferred embodiments, the two-component system contains no epoxy resin other than room temperature liquid epoxy resin. In preferred embodiments, the two-component system contains no epoxy resin other than neat room temperature liquid epoxy resin. In preferred embodiments, the two-component system contains no epoxy resin other than epoxy/reactive diluent room temperature liquid epoxy resin.

The liquid epoxy resin may be a bisphenol-A diglycidylether unmodified epoxy resin or a bisphenol-F diglycidylether unmodified epoxy resin.

Suitable room temperature liquid epoxy resins for use as a neat room temperature liquid epoxy resin may include bisphenol-A polyepoxide resins such as EPON® 828 (Hexion®); D.E.R® 331 (Olin®); bisphenol-A/F polyepoxide resins such as EPON® 232 (Hexion®). Suitable epoxy/diluent combinations for use as epoxy/reactive diluent room temperature liquid epoxy resin may include epoxy novolac resins such as D.E.N.® 438 (Olin®) combined with 1,4-cyclohexandimethanoldiglycidylether; D.E.N.® 431, D.E.N. 425 (Olin®), Epalloy® 9000, Epalloy® 8350 (CVC Thermoset Specialties®).

In preferred embodiments, the two-component system comprises at least 5.0 wt.-% room temperature liquid epoxy resin, in some embodiments at least 7.5 wt.-% room temperature liquid epoxy resin, and in some embodiments at least 10 wt.-% room temperature liquid epoxy resin, in each case relative to the total weight of the two-component system. In preferred embodiments, the two-component system comprises not more than 40 wt.-% room temperature liquid epoxy resin, in some embodiments not more than 35 wt.-% room temperature liquid epoxy resin, in some embodiments not more than 30 wt.-% room temperature liquid epoxy resin, in some embodiments not more than 25 wt.-% room temperature liquid epoxy resin, and in some embodiments not more than 20 wt.-% room temperature liquid epoxy resin, in each case relative to the total weight of the two-component system.

Preferably, the content of the liquid epoxy resin is within the range of 15±10 wt.-%; preferably 15±5.0 wt.-%; in each case relative to the total weight of the two-component system.

The liquid epoxy resin may decrease the viscosity of the two-component system so that it is able to be more easily pumped directly into one or more honeycomb openings.

In preferred embodiments, the two-component system according to the invention is an epoxy-based two-component system wherein the one or more epoxy resins are independently of one another selected from the group consisting of bisphenol-A based liquid epoxy resins, bisphenol-F based liquid epoxy resins, epoxy phenol novolac resins having a viscosity at room temperature in the range of from 1100 mPa·s and 1700 mPa·s, and combinations thereof.

Preferably, the one or more curable polymers of the first component comprise an epoxy phenol novolac resin.

Preferably, the epoxy phenol novolac resin has an epoxy equivalent weight within the range of from 145 to 200 g/eq; preferably from 160 to 185 g/eq, and more preferably from 168 to 178 g/eq; in each case determined according to ASTM D1652.

Suitable epoxy resins are commercially available, e.g. under the series Araldite® EPN by Huntsman Advances Materials®.

Preferably, the content of the epoxy phenol novolac resin is within the range of 30±20 wt.-%; preferably 30±15 wt.-%; more preferably 30±10 wt.-%; most preferably 30±5.0 wt.-%; in each case relative to the total weight of the two-component system.

The second component of the two-component system according to the invention comprises one or more curing agents for the one or more curable polymers. Typically, the entire amount of the one or more curing agents for the curable polymers that is contained in the two-component system is contained in the second component, because otherwise premature reaction with the ingredients of the first component upon storage could hardly be avoided.

Preferably, the one or more curing agents for the one or more curable polymers comprise or essentially consist of one or more curing agents for one or more curable epoxy resins.

Typically, the one or more curing agents assist the two-component system in curing by crosslinking of the one or more curable polymers such as curable epoxy resins.

Preferred curing agents are selected from aliphatic or aromatic amines or their respective adducts, amidoamines, polyamides, cycloaliphatic amines, (e.g. anhydrides, polycarboxylic polyesters, isocyanates, phenol-based resins (such as phenol or cresol novolac resins, copolymers such as those of phenol terpene, polyvinyl phenol, or bisphenol-A formaldehyde copolymers, bishydroxyphenyl alkanes or the like), sulfur or mixtures thereof. Particularly preferred curing agents include modified and unmodified polyamines or polyamides such as triethylenetetramine, diethylenetriamine tetmethylenepentamine, cyanoguanidine, dicyandiamides and the like.

Preferably, the curing agent for the curable polymer is selected from the group consisting of polyamines, polyamides, anhydrides, or combinations thereof. Preferably, however, the two-component system according to the invention does not contain harmful curing agents such as 1,2,3,6-tetrahydromethyl-3,6-methanophthalic anhydride.

The two-component system may include exactly two curing agents. The two-component system may include more than two curing agents.

At least one of the curing agents may be a modified aliphatic amine. The one or more curing agents may include a suitable epoxy curing agent. The one or more curing agents may have one or more amine functionalities. The one or more curing agents may include or essentially consist of polyamide. The one or more curing agents may include or essentially consist of aliphatic amine, e.g., polyfunctional aliphatic amine. The one or more curing agents may include or essentially consist of cycloaliphatic amine. The one or more curing agents may include one or more imidazole functional groups. The one or more curing agents may have an amine value of 20 to 100, e.g., 50 to 65.

The one or more curing agents may be present in an amount sufficient to cause curing of the two-component system to a substantially fully cured state, when the first component and the second component have been mixed with one another over a period not to exceed e.g. 2 hours, while retaining a working life of at least 1 hour, at least 2 hours at least 4 hours or even at least 6 hours at room temperature. By way of illustration, the one or more curing agents may be present in a proportionate amount, by weight, to the total amount of one or more curable polymers, e.g. one or more curable epoxy resins, of 1:1 to 1:10, e.g. 1:5.

As used herein, substantially fully cured state refers to a state of curing when, with the passage of time, a material herein exhibits substantially no variation in its mechanical properties. The two-component system described herein may be cured upon mixing of the two-components with one another and may be considered substantially entirety cured when the composition has a Shore D hardness of at least 20, as measured by EN ISO 868.

In a preferred embodiment, the second component includes a first curing agent and a second curing agent. The first curing agent is preferably designed to partially cure the two-component system after mixing the first component and the second component during processing (e.g., processing, mixing, shaping or a combination thereof) for at least assisting in providing the two-component system with the desirable self-supporting properties. The second curing agent will then finally cure the two-component system. Generally, it is contemplated that any of the curing agents discussed herein or others may be used as the first and second curing agents for the two-component systems and the agents used will preferably depend upon the desired conditions of partial cure.

Partial cure can be accomplished by a variety of techniques. For example, the first curing agent may be present in the second component in sub-stoichiometric amounts such that the one or more curable polymers of the two-component system provide substantially more reaction sites than are actually reacted by the first curing agent. Preferred sub-stoichiometric amounts of first curing agent preferably cause the reaction of no more than 60%, no more than 40%, or no more than 30%, or no more than 25%, or even no more than 15% of the available reaction sites provided by the one or more curable polymers of the two-component system. Alternatively, partial cure may be effected by providing a first curing agent that is only reactive for a percentage of the one or more curable polymers contained in the two-component system such as when multiple different curable polymers are contained in the two-component system and the first curing agent is only reactive with one or a subset of the curable polymers. In such an embodiment, the first curing agent is preferably reactive with no more than 60 wt.-%, no more than 40 wt.-%, or no more than 30 wt.-%, or no more than 25 wt.-%, or even no more than 15 wt.-% of the total content of all curable polymers that are contained in the first component.

One or more curing agents may be present in the second component of the two-component system. Amounts of curing agents can vary widely within the two-component system depending upon the desired structural properties of the two-component system and the like. Exemplary ranges for the curing agents present in the two-component system independently of one another range from 0.001 wt.-% to 30 wt.-%, relative to the total weight of the two-component system.

Preferably, the total content of the one or more curing agents of the second component is within the range of from 5.0 wt.-% to 30 wt. %; preferably within the range of from 7.5 wt.-% to 25 wt. %; in each case relative to the total weight of the two-component system.

Preferably, the total content of the one or more curing agents of the second component is at least about 6.0 wt. %, preferably at least about 8.0 wt.-% more preferably at least about 10 wt. %, still more preferably at least about 12 wt.-%, yet more preferably at least about 13 wt.-%, even more preferably at least about 14 wt.-%, most preferably at least about 15 wt.-%, and in particular at least about 16 wt.-%;

at most about 40 wt.-%, preferably at most about 35 wt.-% more preferably at most about 30 wt.-%, still more preferably at most about 24 wt.-%, yet more preferably at most about 22 wt.-%, even more preferably at most about 20 wt.-%, most preferably at most about 18 wt.-%, and in particular at most about 17 wt.-%; and/or within the range of about 15±10 wt.-%; preferably about 15±5.0 wt.-%;

in each case relative to the total weight of the two-component system.

When the two-component system comprises more than a single curing agent, the above weight content preferably refers to the total content of all curing agents.

Preferably, the one or more curing agents of the second component comprise or essentially consist of one or more curing agents selected from the group consisting of amines, polyamines, amine adducts, polyamine adducts, alkanolamines, amides, polyamides, polyamide adducts, polyamidoamines, phenalkamines, and combinations thereof; preferably polyamines or polyamidoamines.

Preferably, the one or more curing agents of the second component comprise one or more amines selected from the group consisting of (i) aliphatic amines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2-methylpentanediamine, hexamethylenediamine, N-(2-aminoethyl)ethane-1,2-diamine, N-(3-aminopropyl)propane-1,3-diamine, N,N"-1,2-ethanediylbis(1,3-propanediamine), dipropylenetriamine, adipic dihydrazide, and hydrazine;

(ii) cycloaliphatic amines, preferably selected from isophorone diamine (3,5,5-trimethyl-3-aminomethylcyclohexylamine), 4,4'-diaminodicyclohexylmethane, 2,4'-diaminodicyclohexylmethane, 2,2'-diaminodicyclohexylmethane, 3,3'-dimethyl-4,4'-diaminodicyclohexylmethane, N-cyclohexyl-1,3-propanediamine, 1,2-diaminocyclohexane, piperazine, N-aminoethylpiperazine, TCD diamine (3(4),8(9)-bis(aminomethyl)tricyclo[5.2.1.02,6]decane), and 4-methylcyclohexane-1,3-diamine;

(iii) polyamidoamines which are obtained by condensation of a polyamine with a mono- and/or polycarboxylic acid, preferably polyamidoimidazolines;

(iv) mannich bases which are obtained by reaction of a mono- and/or polyhydric phenol with an aldehyde and a polyamine;

(v) aromatic amines, preferably selected from phenylene-1,3-diamine, phenylene-1,4-diamine, 4,4'-diaminodiphenylmethane, 2,4'-diaminodiphenylmethane, and 2,2'-diaminodiphenylmethane;

and mixtures thereof; preferably polyamidoamines, more preferably polyamidoimidazolines.

Preferably, the one or more curing agents of the second component comprise a polyamidoimidazoline curing agent.

Suitable polyamidoimidazolines may be formed by any suitable method. For example, such polyamidoimidazolines may include (homo)polymers or copolymers derived from combinations of polyamines and dicarboxylic acids. Examples of suitable polyamines include, but are not limited to one or more of the following: ethylenediamine; diethylenetriamine; triethylenetetramine; tetraethylenepentamine or mixtures thereof. Examples of suitable dicarboxylic acids include, but are not limited to: dimerised fatty acids; adipic acid and combinations thereof. Suitable polyamidoimidazoline curing agents are commercially available, e.g. under the series Aradur® by Huntsman Advanced Materials®.

Preferably, the content of the polyamidoimidazoline curing agent is at least about 3.5 wt. %, preferably at least about 3.0 wt.-% more preferably at least about 4.5 wt. %, still more preferably at least about 5.0 wt.-%, yet more preferably at least about 5.5 wt.-%, even more preferably at least about 6.0 wt. %, most preferably at least about 6.5 wt. %, and in particular at least about 7.0 wt. %;

at most about 13 wt.-%, preferably at most about 12 wt.-% more preferably at most about 11 wt.-%, still more preferably at most about 10 wt.-%, yet more preferably at most about 9.5 wt.-%, even more preferably at most about 9.0 wt. %, most preferably at most about 8.5 wt. %, and in particular at most about 8.0 wt. %; and/or within the range of about 6.5±5.0 wt.-%; preferably about 6.5±2.5 wt.-%;

in each case relative to the total weight of the two-component system.

Preferably, the one or more curing agents of the second component comprise one or more polyamines selected from the group consisting of (i) aliphatic polyamines, preferably selected from diethylenetriamine, triethylenetetramine, pentaethylenehexamine, trimethylhexamethylenediamine, 2-methylpentanediamine, hexamethylenediamine, N-(2-aminoethyl)ethane-1,2-diamine, N-(3-aminopropyl) propane-1,3-diamine, N,N"-1,2-ethanediylbis(1,3-propanediamine), dipropylenetriamine;

(ii) heterocyclic polyamines, preferably selected from N-aminoethylpiperazine, piperazine, 4,4'-trimethylene-dipiperidine, 1,4-bis(3-aminopropyl)piperazine, 2,5-dimethylpiperazine, and 2,6-dimethylpiperazine;

(iii) araliphatic polyamines, preferably selected from m-xylylenediamine, or p-xylylenediamine, di(aminoethyl)benzene, and tri(aminoethyl)benzene;

(iv) cycloaliphatic polyamines, preferably selected from 1,2-diaminocyclohexane, 4,4'-diaminocyclohexylmethane, isophorone diamine, norbornane diamines, 1,3-bis(aminomethyl)cyclohexane, and N-(3-aminopropyl)propane-1,3-diamine;

(v) polyether amines, preferably selected from triethylene glycol diamine, poly(ethylene glycol-block-propylene glycol)bis(2-amino-2-methyl)ether, tri(2-amino-2-methylethyl)trimethylolpropane ether, bis(3-aminopropyl)polypropylene glycol ether, bis(3-aminopropyl)diethylene glycol ether, bis(2-amino-2-methylethyl) diethylene glycol ether, poly(ethylene oxide)methyl (3-aminopropyl)ether, poly(ethylene oxide)bis(3-aminopropyl)ether, and bis(3-aminopropyl)polytetrahydrofuran;

and mixtures thereof.

Preferably, the one or more curing agents of the second component comprise a polyamine curing agent.

Suitable polyamine curing agents are commercially available, e.g. under the series MEEDAmine® by SRS Meeder®.

Preferably, the content of the polyamine curing agent is at least about 5.5 wt.-%, preferably at least about 6.0 wt.-% more preferably at least about 6.5 wt.-%, still more preferably at least about 7.0 wt. %, yet more preferably at least about 7.5 wt. %, even more preferably at least about 8.0 wt. %, most preferably at least about 8.5 wt. %, and in particular at least about 9.0 wt. %;

at most about 14 wt.-%, preferably at most about 13 wt.-% more preferably at most about 12 wt.-%, still more preferably at most about 11 wt.-%, yet more preferably at most about 10.5 wt.-%, even more preferably at most about 10 wt. %, most preferably at most about 9.5 wt. %, and in particular at most about 9.0 wt. %; and/or within the range of about 8.5±5.0 wt.-%; preferably about 8.5±2.5 wt.-%;

in each case relative to the total weight of the two-component system.

In a preferred embodiment, the two-component system comprises a first curing agent and a second curing agent.

Preferably, the first curing agent comprises a polyamide, preferably a polyamidoimidazoline and the second curing agent comprises a polyamine; or the first curing agent comprises a polyamine and the second curing agent comprises a polyamide, preferably a polyamidoimidazoline.

Preferably, the first component and/or the second component, preferably the second component, comprise a curing catalyst (also referred to as curing accelerator).

Accelerators for the one or more curing agents include but are not limited to modified or unmodified urea such as aromatic substituted ureas, e.g. methylene diphenyl bis urea; imidazoles such as 2-ethyl-methylimidazole; metal carbamates such as copper dimethyl dithiocarbamate, zinc dibutyl dithiocarbamate, or the like); disulfides such as dibenzothiazole disulfide; aliphatic and aromatic tertiary amines such as dimethylaminopropylamine; pyridine; boron complexes, including boron complexes with monoethanolamine; and combinations thereof.

Preferably, the curing catalyst is selected from the group consisting of modified or unmodified urea, imidazoles, secondary amines, tertiary amines, quaternary ammonium salts, and pyridines; preferably tertiary amines.

Examples of suitable tertiary amine compounds include, for example, trialkylamines such as triethylamine, trimethylamine, tertiary diamines such as N,N,N'N'-tetramethylbutane diamine, 1,7-bis(dimethylamino)heptane, bis(4-dimethylaminophenyl)methane and triethylenediamine, aromatic amines such as N,N-dimethylaniline, nitrogen-containing heterocyclic compounds such as 1-methylimidazole, benzimidazole, 2-phenylimidazole and quinoline, and aminophenols. The curing catalyst may have an amine value of 550 to 700, e.g., 610 to 635.

Suitable curing catalysts are amine-based catalysts that are commercially available, e.g. under the series NT by Cardolite®.

As suggested, curing accelerators can be particularly desirable for shortening the time between onset of cure and substantially full cure (i.e., at least 90% of possible cure for the particular two-component system) and curing the two-component system while it maintains its self-supporting characteristics. As used herein, onset of cure is used to mean at least 3% but no greater than 10% of substantially full cure. Generally, it is contemplated that experimentation by the skilled artisan can produce desirable cure times using various of the curing agents and/or accelerators discussed above or others.

Preferably, the content of the curing catalyst is at least about 0.6 wt. %, preferably at least about 0.8 wt.-% more preferably at least about 1.0 wt. %, still more preferably at least about 1.2 wt.-%, yet more preferably at least about 1.4 wt.-%, even more preferably at least about 1.6 wt.-%, most preferably at least about 1.8 wt.-%, and in particular at least about 2.0 wt.-%;

at most about 6.5 wt.-%, preferably at most about 6.0 wt.-% more preferably at most about 5.5 wt.-%, still more preferably at most about 5.0 wt.-%, yet more preferably at most about 4.5 wt.-%, even more preferably at most about 3.5 wt.-%, most preferably at most about 3.0 wt.-%, and in particular at most about 2.5 wt.-%; and/or within the range of about 2.0±1.0 wt.-%; preferably about 2.0±0.5 wt.-%;

in each case relative to the total weight of the two-component system.

Preferably, the total content of the one or more curing agents of the second component and the curing catalyst is at least about 6.0 wt. %, preferably at least about 8.0 wt.-% more preferably at least about 10 wt. %, still more preferably at least about 12 wt.-%, yet more preferably at least about 14 wt.-%, even more preferably at least about 15 wt.-%, most preferably at least about 16 wt.-%, and in particular at least about 17 wt.-%;

at most about 25 wt.-%, preferably at most about 24 wt.-% more preferably at most about 23 wt.-%, still more preferably at most about 22 wt.-%, yet more preferably at most about 21 wt.-%, even more preferably at most about 20 wt.-%, most preferably at most about 19 wt.-%, and in particular at most about 18 wt.-%; and/or within the range of about 17±10 wt.-%; preferably about 17±5.0 wt.-%;

in each case relative to the total weight of the two-component system.

The first component and/or the second component of the two-component system according to the invention additionally comprise an ammonium polyphosphate and a metal hydroxide thereby providing the two-component system with fire retardant properties. Besides the ammonium polyphosphate and the metal hydroxide, the first component and/or the second component of the two-component system may contain additional ingredients further contributing to fire retardancy such as liquid phosphate esters, phosphorous organic compounds, expandable graphite, zeolites, or combinations thereof. For the purpose of the specification, the fire retardant comprises at least the ammonium polyphosphate and the metal hydroxide.

Fire retardants are known to the person skilled in the art and are typically substances that are used to slow or stop the spread of fire or reduce its intensity. At this point, reference is made to the following books as examples: A. R. Horrocks, D. Price, Fire retardant Materials, Woodhead Publishing, 2001 or A. R. Horrocks, D. Price, Advances in Fire retardant Materials, Woodhead Publishing, 2008.

For the purpose of the specification, a fire retardant may have the effect of retarding flame formation (flame retardant), suppress smoke formation (smoke suppressor), provide synergism to flame retardancy (flame retardant synergist), swelling upon heat exposure (intumescent) and any combination thereof.

The fire retardant is sufficient so that when the two-component system is cured it will meet the requirements for flame retardancy as set forth in 14 C.F.R. § 25.853 (the United States Code of Federal Regulations for aerospace compartment interiors, including but not limited to 14 C.F.R. § 25.853(a), and the referenced Appendix F and procedures referenced therein (e.g., 60 seconds vertical burn test per 14 C.F.R. § 25.853 App. F Part 1(a)(1)(i), smoke density test per 14 C.F.R. § 25.853 App. F Part V) or the smoke toxicity test per AITM 3.0005 (as required by Airbus), all of which are incorporated by reference for all purposes).

The proportionate amount, by weight, of the fire retardant relative to the one or more curable polymers, e.g. epoxy resins, may be 2:1 to 1:3, e.g., 1:2.

Upon achieving a degree of cure of at least 75%, a resulting cured two-component system (cured material) preferably exhibits sufficient flame retardancy to meet the requirements of one or more of FAR 25.853.

The first component and/or the second component of the two-component system according to the invention additionally comprise an ammonium polyphosphate.

Preferably, the total quantity of the ammonium polyphosphate is contained in the first component.

The ammonium polyphosphate, which preferably acts as a flame retardant, is preferably employed and commercially available in form of a powder.

Preferably, the ammonium polyphosphate is selected from the group consisting of crystal phase I ammonium polyphosphates (APP, phase I), crystal phase II ammonium polyphosphates (APP, phase II) or combinations thereof.

Preferably, the ammonium polyphosphate essentially consists of crystal phase II ammonium polyphosphate (APP, phase II).

A preferred crystal phase II ammonium polyphosphate (APP, phase II) is commercially available as Aflammit® PCI 202 from Thor.

The ammonium polyphosphate provides particularly good flame resistance, has a good influence on smoke density (smoke opacity), and has a good influence on smoke toxicity at an advantageous weight content within the two-component system. The ammonium polyphosphate has the disadvantage of a comparatively high price.

Preferably, the ammonium polyphosphate has an average molecular weight within the range of from abbot 500 g/mol to 5000 g/mol, or 1000 g/mol to 3500 g/mol, or 1500 g/mol to 3000 g/mol; and/or has a phosphorous content of at least 15%, or at least 20%, or at least 25%, or at least 30%; and/or has a nitrogen content of at least 4%, or at least 7%, or at least 10%, or at least 13%.

The ammonium polyphosphate may or may not be encapsulated.

Suitable non encapsulated ammonium polyphosphates can be readily available commercially, under the tradename Exolit® AP 422 from Clariant, FR Cros® 484 from Chemische Fabrik Budenheim, Budenheim am Rhein, Germany, Antiblaze® LR3 from Albemarle, APP1001 from Dgtech International and Aflammit® PCI 202 from Thor.

In a preferred embodiment, the ammonium polyphosphate is encapsulated. Suitable encapsulated ammonium polyphosphates are described in U.S. Pat. Nos. 4,347,334, 4,467,056, 4,514,328, and 4,639,331 hereby incorporated by reference. Such encapsulated ammonium polyphosphates contain a hardened, water insoluble resin enveloping the individual ammonium polyphosphate particles. The resin may be a phenol-formaldehyde resin, an epoxy resin, a surface reacted silane, a surface reacted melamine or a melamine-formaldehyde resin. As an example for use is the encapsulated ammonium polyphosphate available under the trademark FR CROS® C 60, FR CROS® C30, FR CROS® C70 from Chemische Fabrik Budenheim, Budenheim am Rhein, Germany, EXOLIT® AP 462 from Clariant. For example, the encapsulated ammonium polyphosphate can be a melamine-formaldehyde encapsulated ammonium polyphosphate additive.

Preferably, the two-component system has a content of the ammonium polyphosphate within the range of from 1.0 wt.-% to 20 wt. %, preferably within the range of from 2.5 wt.-% to 15 wt. %, in each case relative to the total weight of the two-component system.

Preferably, the content of the ammonium polyphosphate is within the range of 10±9.5 wt.-% or 10±4.5 wt.-%; more preferably 5.0±4.5 wt.-%; still more preferably 5.0±2.5 wt.-%; in each case relative to the total weight of the two-component system.

When the two-component system according to the invention contains two or more ammonium polyphosphates, the total content refers to the total amount of all ammonium polyphosphates that are contained in the two-component system.

The first component and/or the second component of the two-component system according to the invention additionally comprise a metal hydroxide.

Preferably, a first portion of the metal hydroxide is contained in the first component and a second portion of the metal hydroxide is contained in the second component.

Preferably, the metal hydroxide comprises or essentially consists of alumina trihydrate.

The metal hydroxide, which preferably acts as a flame retardant as well as a smoke suppressor, is preferably also employed and commercially available in form of a powder.

Preferably, the metal hydroxide is selected from the group consisting of aluminum trihydroxide (ATH), magnesium dihydroxide (MDH), and mixtures thereof.

In a preferred embodiment, the metal hydroxide essentially consists of aluminum trihydroxide (ATH).

Suitable metal hydroxides are commercially available, e.g. under the series ATH by Alteo®.

In another preferred embodiment, the metal hydroxide essentially consists of aluminum trihydroxide and minor amounts of silicon dioxide ($SiO_2$), iron oxide ($Fe_2O_3$) and disodium oxide ($Na_2O$), e.g. MoldX® A 400 which is obtainable by J. M. Huber Corporation®.

Preferably, the content of the metal hydroxide is within the range of from 0.1 wt.-% to 50 wt.-%, more preferably within the range of from 5 wt.-% to 45 wt.-%, most preferably within the range of from 10 wt.-% to 40 wt.-%, in each case relative to the total weight of the two-component system.

Preferably, the total content of the metal hydroxide is within the range of 30±20 wt.-%; preferably 30±15 wt.-%; more preferably 30±10 wt.-%; most preferably 30±5.0 wt.-%; in each case relative to the total weight of the two-component system.

When the two-component system according to the invention contains two or more metal hydroxides, the total content refers to the total amount of all metal hydroxides that are contained in the two-component system.

The metal hydroxide provides excellent flame resistance, has a very good influence on smoke density (smoke opacity), and has an excellent influence on smoke toxicity at a comparatively high weight content within the two-component system. The metal hydroxide has the disadvantage of a comparatively high density.

In a preferred embodiment, the relative weight ratio of the ammonium polyphosphate (or when there is more than one ammonium polyphosphate, of the total weight of all ammonium polyphosphates) to the metal hydroxide (or when there is more than one metal hydroxide, of the total weight of all metal hydroxides) is within the range of from 5:1 to 1:5, or 4:1 to 1:4, or 3:1 to 1:3, or 2:1 to 1:2, or 1.5:1 to 1:1.5.

In another preferred embodiment, the relative weight ratio of the ammonium polyphosphate (or when there is more than one ammonium polyphosphate, of the total weight of all ammonium polyphosphates) to the metal hydroxide (or when there is more than one metal hydroxide, of the total weight of all metal hydroxides) is within the range of from 5:1 to 111, or 4:1 to 1.1:1, or 3:1 to 1.1:1, or 2:1 to 111, or 1.5:1 to 1.1:1.

In still another preferred embodiment, the relative weight ratio of the metal hydroxide (or when there is more than one metal hydroxide, of the total weight of all metal hydroxides) to the ammonium polyphosphate (or when there is more than one ammonium polyphosphate, of the total weight of all ammonium polyphosphates) is within the range of from 5:1 to 111, or 4:1 to 111, or 3:1 to 1.1:1, or 2:1 to 111, or 1.5:1 to 1.1:1.

In a preferred embodiment, the first component and/or the second component of the two-component system according to the invention additionally comprise an expandable graphite.

The expandable graphite, which preferably acts as a flame retardant as well as a smoke suppressor and as intumescent, is preferably also employed and commercially available in form of a powder.

Expandable graphite is commercially available, e.g. as Aflammit® PCI 599 obtainable from Thor.

Preferably, the content of the expandable graphite is at most 10 wt.-%, more preferably at most 9.0 wt.-%, still more preferably at most 8.0 wt.-%, yet more preferably at most 7.0 wt.-%, even more preferably at most 6.0 wt.-%, most preferably at most 5.5 wt.-%, and in particular at most 5.0 wt.-%, in each case relative to the total weight of the two-component system. Preferably, the content of the expandable graphite is within the range of from 0.1 wt.-% to 10 wt. %, more preferably within the range of from 1 wt.-% to 8 wt. %, most preferably within the range of from 3 wt.-% to 5 wt.-%, in each case relative to the total weight of the two-component system.

When the two-component system according to the invention contains two or more expandable graphites, the total content refers to the total amount of all expandable graphites that are contained in the two-component system.

Preferably, however, the two-component system according to the invention does not comprise any graphite (e.g. expandable graphite, intumescent graphite, and the like). According to the invention, the combination of ammonium polyphosphate with metal hydroxide, preferably aluminum trihydrate, is used instead of graphite. This has various advantages. For example, in the absence of graphite, the cured material has a homogenous appearance and color without black spots. Upon exposure to fire, no holes are formed which holes otherwise may cause problems as they allow the fire to move along the cured material from one zone to another zone.

In a preferred embodiment, the first component and/or the second component of the two-component system according to the invention additionally comprise a liquid phosphate ester. In another preferred embodiment, the two-component system according to the invention does not comprise a liquid phosphate ester.

The phosphate ester, which preferably acts as a flame retardant, is preferably employed and commercially available in form of a liquid. Furthermore, it has been surprisingly found that it may act as a diluent for the two-component system such that the content of other liquid constituents, such as epoxy resin diluents and/or liquid epoxy resins, can be significantly reduced or even be completely omitted, while still imparting a pasty consistency.

Preferably, the liquid phosphate ester is a liquid aromatic phosphate ester, preferably having a phosphorous content of at least 4 wt.-%, more preferably of at least 6 wt.-%, still more preferably of at least 8 wt.-% and particularly preferred of at least 10 wt. %.

A particular preferred liquid phosphate ester is tetraphenyl-m-phenylene bis(phosphat), e.g. Aflammit® PFL 280 obtainable from Thor.

Preferably, the content of the liquid phosphate ester, preferably a liquid aromatic phosphate ester, is within the range of from 0.1 wt.-% to 5 wt.-%, more preferably within the range of from 1.0 wt.-% to 3.0 wt.-%, most preferably within the range of from 1.5 wt.-% to 2.0 wt.-%, in each case relative to the total weight of the two-component system.

When the two-component system according to the invention contains two or more liquid phosphate esters, the total content refers to the total amount of all liquid phosphate esters that are contained in the two-component system.

In a preferred embodiment, the first component and/or the second component of the two-component system according to the invention additionally comprise a phosphorous organic compound or salt thereof. In another preferred embodiment, the two-component system according to the invention does not comprise a phosphorous organic compound or salt thereof.

Preferably, the phosphorous organic compound or salt thereof does not include phosphate esters.

The phosphorous organic compound or salt thereof, which preferably acts as a flame retardant, is preferably employed and commercially available in form of a powder.

Preferably, the content of the phosphorous organic compound or salt thereof is within the range of from 0.1 wt.-% to 3.0 wt.-%, more preferably within the range of from 0.5 wt.-% to 2.6 wt.-%, most preferably within the range of from 0.9 wt.-% to 1.5 wt.-%, in each case relative to the total weight of the two-component system.

When the two-component system according to the invention contains two or more phosphorous organic compounds or salts thereof, the total content refers to the total amount of all phosphorous organic compounds or salts thereof that are contained in the two-component system.

In a preferred embodiment, the first component and/or the second component of the two-component system according to the invention additionally comprise a zeolite. In another preferred embodiment, the two-component system according to the invention does not comprise a zeolite.

The zeolite, which preferably acts as a flame retardant synergist, is preferably employed and commercially available in form of a powder.

In a particular preferred embodiment, the zeolite comprises a sodium form of a synthetic type A zeolite having a pore opening size within the range of from 2.0 to 6.0 Å, preferably 3.0 to 5.0 Å, more preferably 3.5 to 4.5 Å, still more preferably 3.8 to 4.2 Å.

Preferably, the content of the zeolite is within the range of from 0.1 wt.-% to 10.0 wt.-%, more preferably within the range of from 1.0 wt.-% to 8.0 wt.-%, most preferably within the range of from 3.0 wt.-% to 5.0 wt.-%, in each case relative to the total weight of the two-component system.

The first component and/or the second component of the two-component system according to the invention additionally comprise a filler. The filler is a light-weight filler selected from the group consisting of polymeric microspheres, hollow glass microspheres, and thixotropic fillers.

Preferably, a first portion of the filler is contained in the first component and a second portion of the filler is contained in the second component.

For the purpose of the specification, non-thixotropic filler includes but is not limited to polymeric microspheres and hollow glass microspheres.

In preferred embodiments of the invention, the two-component system comprises a filler, wherein the filler comprises polymeric microspheres and/or hollow glass microspheres and/or a thixotropic filler; preferably polymeric microspheres as well as hollow glass microspheres as well as a thixotropic filler.

The two-component system may include a filler having a relatively high surface area to weight ratio; that is, taking into account the density of the filler and its particle sizes. Light-weight low-density fillers are preferred.

Typical fillers include but are not limited to particulated materials such as powders, beads, microspheres, or the like. Preferably, the filler includes a relatively low-density material that is generally non-reactive with the other components present in the two-component system.

The filler may comprise further materials that may be regarded as filler. Suitable fillers may be an organic filler, an inorganic filler, or a combination of both. The filler may be a hollow filler. The filler may include hollow particles which may be hollow glass microspheres. The filler may consist essentially of hollow glass microspheres. The filler may have an elongated geometry. The filler may have a spherical geometry. The filler may be in a particulated form. The filler may be in the form of a rod, a bead, a whisker, a platelet or any combination thereof. The filler may include silicon. The filler may include amorphous silica. The filler may include soda lime borosilicate glass. The filler may include fumed silica. One illustrative filler includes a plurality of glass beads. For example, the glass beads may be hollow glass microspheres. The glass beads may be hollow glass microspheres. An example of a commercially available filler is a glass bubble product offered by Potters Industries under the designation Sphericel® 34P30.

Examples of fillers include silica, diatomaceous earth, glass, clay, talc, pigments, colorants, glass beads or bubbles, glass, carbon ceramic fibers, antioxidants, and the like. Such fillers, particularly clays, can assist the two-component system in leveling itself during flow of the two-component system. The clays that may be used as fillers may include clays from the kaolinite, illite, chloritem, smecitite or sepiolite groups, which may be calcined. Examples of suitable fillers, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In a preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular improve the impact resistance of the cured two-component system.

In another preferred embodiment, the filler is selected from the group consisting of fused borosilicate glass in a hollow microsphere or bubble form, acrylonitrile copolymer with inert exterior calcium carbonate coating or combinations thereof.

It is contemplated that one of the fillers or other components of the two-component system may be thixotropic for assisting in controlling flow of the two-component system as well as properties such as tensile, compressive or shear strength. Such thixotropic fillers can additionally provide self-supporting characteristics to the two-component system. Examples of thixotropic fillers include, without limitation, silica, calcium carbonate, clays, aramid fiber or pulp or others. One preferred thixotropic filler is synthetic amorphous precipitated silicon dioxide. A particularly preferred thixotropic filler is fumed silica, i.e. synthetic amorphous silicon dioxide produced by flame hydrolysis.

In a preferred embodiment, the first component and/or the second component of the two-component system according to the invention are thixotropic pastes. In another preferred embodiment, neither the first component nor the second component of the two-component system according to the invention are thixotropic pastes.

The content of the fillers in the two-component system can range from 10 wt.-% to 90 wt.-%, relative to the total weight of the two-component system. Preferably, the two-component system has a content of the filler within the range of from 0.1 wt.-% to 30 wt. %, more preferably within the range of from 0.5 wt.-% to 20 wt. %, most preferably within the range of from 1.0 wt.-% to 10 wt.-%, in each case relative to the total weight of the two-component system.

When the two-component system according to the invention contains two or more fillers, the total content refers to the total amount of all fillers that are contained in the two-component system.

Preferably, the filler has an overall density in the range of $0.18\pm0.16\ g\cdot cm^{-3}$, more preferably $0.18\pm0.12\ g\cdot cm^{-3}$, still more preferably $0.18\pm0.08\ g\cdot cm^{-3}$. Thus, when the filler comprises more than a single component, the calculated additive densities of the individual components at their respective relative content amounts to an overall density within the above range, not taking into account any packaging phenomena.

Preferably, the filler has a bulk density in the range of from 0.02 $g \cdot cm^{-3}$ to 0.25 $g \cdot cm^{-3}$. When the two-component system according to the invention contains two or more fillers, the bulk density of each filler that contained in the two-component system is within the specified range.

In a preferred embodiment, the two-component system contains a non-thixotropic filler, e.g. polymeric microspheres and/or hollow glass microspheres. The non-thixotropic filler may be a relatively high volume to weight filler. The filler may have a density (i.e. a true particle density), per ASTM C128 of 0.01 to 5 $g \cdot cm^{-3}$, 0.01 to 1 $g \cdot cm^{-3}$, or even 0.02 $g \cdot cm^{-3}$ to 0.30 $g \cdot cm^{-3}$.

In a particular preferred embodiment, the two-component system contains a thixotropic filler, preferably fumed silica.

When a thixotropic filler is employed, the thixotropic filler may have a density (i.e. a true particle density), per ASTM C128 of 0.01 to 5 $g \cdot cm^{-3}$, 0.1 to 4 $g \cdot cm^{-3}$, or even 1 $g \cdot cm^{-3}$ to 3 $g \cdot cm^{-3}$.

Preferably, the thixotropic filler has a density in the range of from 2.0 to 2.5 $g \cdot cm^{-3}$, more preferably 2.1 to 2.4 $g \cdot cm^{-3}$, still more preferably 2.2 to 2.3 $g \cdot cm^{-3}$.

A particularly preferred thixotropic filler contained in the two-component system according to the invention is hydrophobic fumed silica having a surface which was treated with polydimethylsiloxane (PDMS), e.g. Cab-O-Sil® TS 720 which is obtainable by the Cabot Corporation, Alpharetta, Georgia.

The filler may include hollow glass microspheres. The filler may consist essentially of hollow glass microspheres characterized by a particle size of from 20 μm to 70 μm, whereby at least 50% of the particles have a particle size of at least 35 μm.

In a preferred embodiment, the filler comprises or essentially consists of hollow glass microspheres, which have a density of more than 0.20 $g \cdot cm^{-3}$ but not more than 0.70 $g \cdot cm^{-3}$, preferably within the range of 0.22±0.04 $g \cdot cm^{-3}$, for the purpose of the invention also referred to as "high density hollow glass microspheres". Such high-density hollow glass microspheres are commercially available, e.g. Sphericel® 34P30. The advantage of high-density hollow glass microspheres is that they still reduce the density of the two-component system. However, the disadvantage of the low-density hollow glass microspheres is that they increase viscosity and also still reduce mechanical strength, e.g. in terms of compressive strength.

The filler may include an acrylonitrile copolymer shell. The filler may reduce the density of the two-component system while increasing the volume of the two-component system.

In preferred embodiment, the filler comprises or essentially consists of polymeric microspheres, which have a density of not more than 0.10 $g \cdot cm^{-3}$, preferably within the range of 0.05±0.04 $g \cdot cm^{-3}$, for the purpose of the invention also referred to as "very low density polymeric microspheres". Such very low-density polymeric microspheres are commercially available, e.g. Dualite® E030. The advantage of very low-density polymeric microspheres is that they very strongly reduce the density of the two-component system. However, the disadvantage of the very low-density polymeric microspheres is that they increase viscosity and also very strongly reduce mechanical strength, e.g. in terms of compressive strength.

Preferably, the weight content of such very low density polymeric microspheres is at most 15 wt.-%, more preferably at most 14 wt.-%, still more preferably at most 13 wt.-%, yet more preferably at most 12 wt.-%, even more preferably at most 11 wt.-%, most preferably at most 10 wt.-% and in particular at most 9.0 wt.-%, in each case relative to the total weight of the two-component system.

In a preferred embodiment, the filler comprises or essentially consists of hollow glass microspheres, which have a density of more than 0.10 $g \cdot cm^{-3}$ but not more than 0.30 $g \cdot cm^{-3}$, preferably within the range of 0.25±0.04 $g \cdot cm^{-3}$, for the purpose of the invention also referred to as "low density hollow glass microspheres". Such low-density hollow glass microspheres are commercially available, e.g. Sphericel® 25P45. The advantage of low-density hollow glass microspheres is that they still significantly reduce the density of the two-component system. However, the disadvantage of the low-density hollow glass microspheres is that they increase viscosity and also still significantly reduce mechanical strength, e.g. in terms of compressive strength.

Preferably, the weight content of such low-density hollow glass microspheres is at most 15 wt.-%, more preferably at most 14 wt.-%, still more preferably at most 13 wt.-%, yet more preferably at most 12 wt.-%, even more preferably at most 11 wt.-%, most preferably at most 10 wt.-% and in particular at most 9.0 wt.-%, in each case relative to the total weight of the two-component system.

In a preferred embodiment, the filler comprises a combination of microspheres having different properties, especially different density. Preferably, the filler comprises at least two different microspheres selected from very low-density polymeric microspheres, low-density hollow glass microspheres, and high-density hollow glass microspheres as defined above.

In a preferred embodiment, the filler comprises very low density polymeric microspheres and high density hollow glass microspheres, preferably at a relative weight ratio within the range of from 3:1 to 1:3, or from 2:1 to 1:2, or from 1.5:1 to 1:1.5, or from 3:1 to 1.1:1, or from 2:1 to 1.1:1, or from 1.5:1 to 1.1:1, or from 1:1.1 to 1:3, or from 1:1.1 to 1:2, or from 1.1:1 to 1:1.5.

In another preferred embodiment, the filler comprises very low density polymeric microspheres and low density hollow glass microspheres, preferably at a relative weight ratio within the range of from 3:1 to 1:3, or from 2:1 to 1:2, or from 1.5:1 to 1:1.5, or from 3:1 to 1.1:1, or from 2:1 to 1.1:1, or from 1.5:1 to 1.1:1, or from 1:1.1 to 1:3, or from 1:1.1 to 1:2, or from 1.1:1 to 1:1.5.

In still another preferred embodiment, the filler comprises low density hollow glass microspheres and high density hollow glass microspheres, preferably at a relative weight ratio within the range of from 3:1 to 1:3, or from 2:1 to 1:2, or from 1.5:1 to 1:1.5, or from 3:1 to 111, or from 2:1 to 111, or from 1.5:1 to 111, or from 1:1.1 to 1:3, or from 1:1.1 to 1:2, or from 1.1:1 to 1:1.5.

The filler may include or may consist essentially of hollow glass microspheres characterized by a particle size of from 20 μm to 70 μm, whereby preferably at least 50% of the particles have a particle size of at least 35 μm.

In a preferred embodiment, the two-component system according to the invention contains no hollow glass microspheres. According to this embodiment, the filler preferably comprises or essentially consists of polymeric microspheres. The advantage of using polymeric microspheres instead of hollow glass microspheres is the reduced density so that less filler is needed and the respective amount can be substituted by additional fire retardants thereby further improving the pyrolytic properties of the cured material, e.g. with respect to smoke density and smoke toxicity. A disadvantage of using polymeric microspheres instead of hollow glass microspheres the lower mechanical resistance of polymeric microspheres compared to hollow glass microspheres. It has been surprisingly found, however, that satisfactory mechanical properties can be achieved with polymeric microspheres. In particular, it has been found that mechanical properties remain within the specifications applied e.g. by aircraft industries, whereas HSE profiles can be significantly improved due to the higher amounts and type of fire retardants, smoke suppressors and the like.

The filler may be present, by weight, in a proportion of filler relative to the total curable polymer, e.g. epoxy resin, of 1:5 to 2:1, e.g., 1:3 to 1:1, or even 1:2.5. The proportion of the weight of the curable polymer, e.g. epoxy resin, relative to the filler is preferably 5:1 to 1:2.

Preferably, the filler comprises or essentially consists of polymeric microspheres.

Preferably, the filler has a true density of 25±15 $kg \cdot m^{-3}$; preferably 25±10 $kg \cdot m^{-3}$; more preferably 25±5 $kg \cdot m^{-3}$; most preferably 25±3 $kg \cdot m^{-3}$; in each case determined according to ASTM D1505.

Suitable low-density polymeric microspheres are commercially available, e.g. under the series Expancel® DE or DET grades by Nouiyon®.

Preferably, the total content of the filler is within the range of 3.0±2.5 wt.-%; preferably 3.0±2.0 wt.-%; more preferably 3.0±1.5 wt. %; most preferably 3.0±1.0 wt. %; in each case relative to the total weight of the two-component system.

Preferably, the total content of the filler is within the range of 60±20 vol.-%; preferably 600±15 vol.-%; more preferably 60±10 vol.-%; most preferably 60±5.0 vol.-%; in each case relative to the total volume of the two-component system.

The first component and/or the second component of the two-component system according to the invention may additionally comprise additives that are conventionally used in structural void filling composition. Examples of such additives include but are not limited to coloring agents, pigments, wetting/dispersing/anti-foaming agents, UV stabilizers, heat stabilizers, antioxidants, processing aids, lubricants, plasticizers, impact modifiers, flexibilizers, thickeners, reinforcements (e.g. chopped or continuous glass fibers, ceramic fibers, aramid fibers, carbon fibers or the like), and combinations thereof.

In a preferred embodiment, the additives are divided into two portions, one portion being contained in the first component, the other portion being contained in the second component.

In preferred embodiments, the two-component system additionally comprises one or more pigments.

In preferred embodiments, the two-component system additionally comprises one or more toughening agents.

In preferred embodiments, the two-component system additionally comprises one or more rheology modifiers.

In preferred embodiments, the two-component system additionally comprises one or more mineral particles. In preferred embodiments, the mineral particles are alumina. In preferred embodiments, the mineral particles are silica, e.g. fumed silica. In preferred embodiments, the mineral particles are calcite. Preferably, the content of mineral particles is at most 10 wt.-%, more preferably at most 9.0 wt.-%, still more preferably at most 8.0 wt.-%, yet more preferably at most 7.0 wt.-%, even more preferably at most 6.0 wt.-%, most preferably at most 5.0 wt.-%, and in particular at most 4.0 wt.-%, in each case relative to the total weight of the two-component system.

In preferred embodiments, the composition additionally comprises one or more fibers.

The content of these additives will usually amount to 0.001 to 10 wt.-%, relative to the total weight of the two-component system.

Suitable coloring agents are epoxy color pastes that are commercially available, e.g. under the series EPX® by LLEWELLYN RYLAND LTD®.

Suitable wetting/dispersing/anti-foaming agents are commercially available, e.g. under the series W or P by Byk® or the series Dispers by Tego®.

In a preferred embodiment, the first component and/or the second component of the two-component system according to the invention may additionally comprise a thermoplastic resin.

Any suitable thermoplastic resin may be used in the two-component system according to the invention. Preferably, the thermoplastic resin has a Vicat softening point of between 60° C. and 150° C., as measured by EN ISO 306 method A50. In preferred embodiments, the thermoplastic resin has a softening point of not more than 150° C., in some embodiments not more than 135° C., in some embodiments not more than 120° C., in some embodiments not more than 105° C., and in some embodiments not more than 95° C. In preferred embodiments, the thermoplastic resin has a softening point of at least 60° C., in some embodiments at least 70° C., and in some embodiments at least 80° C. Preferably, the thermoplastic resin is a polymer comprising phenylene oxide (-Ph-O—) units in its polymer backbone. In preferred embodiments, the thermoplastic resin is a phenoxy resin. In preferred embodiments, the thermoplastic resin is a copolymer of bisphenol a and epichlorohydrin. In preferred embodiments the thermoplastic resin is a polyethersulfone.

In preferred embodiments, the two-component system comprises at least 10 wt.-% thermoplastic resin, in some embodiments at least 16 wt.-% thermoplastic resin, and in some embodiments at least 18 wt.-% thermoplastic resin, in each case relative to the total weight of the two-component system. In preferred embodiments, the two-component system comprises not more than 35 wt.-% thermoplastic resin, in some embodiments not more than 30 wt.-% thermoplastic resin, and in some embodiments not more than 25 wt.-% thermoplastic resin, in each case relative to the total weight of the two-component system. Alternatively, the two-component system may be substantially free of any thermoplastic resin.

In a preferred embodiment, the first component and/or the second component of the two-component system according to the invention may additionally comprise a diluent. The epoxy resin diluent, if present, may be an aromatic monofunctional epoxy. The epoxy resin diluent may be a nonyl phenol glycidyl ether. The epoxy resin diluent may have a viscosity at 25° C. per ASTM D445 of 80 to 180 mPas, e.g., 100 to 140 mPas. The epoxy resin diluent may have an epoxy equivalent weight (g/eq) per ASTM D1652 of 200 to 400 g/eq, e.g. 300 to 325 g/eq. The epoxy resin diluent may be commercially available, such as Erisys® GE-12, available from CVC Thermoset Specialties®. Alternatively, the two-component system may be substantially free of any diluent.

In a preferred embodiment, the first component and/or the second component of the two-component system according to the invention may additionally comprise an elastomer or rubber, which can be one elastomer or a mixture of several different elastomers. When employed, the content of the elastomer(s) is preferably at least 5 wt.-%, more preferably at least 14 wt.-%, even more preferably at least 25 wt.-% and preferably not more than 65 wt.-%, more preferably not more than 45% and even more preferably not more than 35 wt.-%, in each case relative to the total weight of the two-component system. When the elastomer does not contain functional groups that are capable of reacting with the curing agent, the weight content of the elastomer(s), if contained, does not contribute to the overall weight content of the one or more curable polymers.

Suitable rubbers and elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene monomer rubbers), chlorosulphonated polyethylene, fluorinated hydrocarbons and the like. Particularly preferred elastomers are EPDMs sold under the tradename VISTALON® 7800 and 2504, commercially available from Exxon Mobil Chemical. Another preferred elastomer is a polybutene isobutylene butylenes copolymer sold under the tradename H-1500, commercially available from BP Amoco Chemicals.

An elastomer-containing adduct can also be employed in the two-component system of the present invention such as an epoxy/elastomer adduct. When the curable polymer comprises an epoxy resin that is capable of reacting with the curing agent, the epoxy/elastomer adduct is typically also capable of reacting with the curing agent. Thus, the weight content of the epoxy/elastomer adduct(s), if contained, contribute to the overall weight content of the one or more curable polymers.

The elastomer-containing adduct may be included in an amount of up to 80 wt.-% of the two-component system or more, relative to the total weight of the two-component system. More preferably, the weight content of the elastomer-containing adduct, when included, is 20 wt.-% to 80 wt.-%, and more preferably is 30 wt.-% to 70 wt.-%, in each case relative to the total weight of the two-component system.

In turn, the elastomer-containing adduct itself preferably is an epoxy/elastomer adduct and includes 1:5 to 5:1 parts of epoxy resin to elastomer, and more preferably 1:3 to 3:1 parts of epoxy resin to elastomer.

The elastomer incorporated in the elastomer-containing adduct may be a thermosetting or other elastomer. Exemplary elastomers include, without limitation natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In a preferred embodiment, recycled tire rubber is employed.

The elastomer-containing adduct, when added to the two-component system, preferably is added to modify structural properties of the two-component system such as strength, toughness, stiffness, flexural modulus, or the like. Additionally, the elastomer-containing adduct may be selected to render the two-component system more compatible with coatings such as water-borne paint or primer system or other conventional coatings.

Alternatively, the two-component system may be substantially free of any elastomer, rubber, and elastomer-containing adduct.

The two-component system according to the invention preferably does not contain hollow glass microspheres.

The two-component system according to the invention preferably does not contain brominated epoxy resins.

The two-component system according to the invention preferably does not contain any halogen source, i.e. the two-component system according to the invention is preferably halogen free.

The two-component system according to the invention preferably does not contain 2,2'-iminodi(ethylamine).

The two-component system according to the invention preferably does not contain graphite, e.g. expandable graphite.

The two-component system according to the invention preferably does not contain blowing agents, i.e. is preferably not volume expandable upon activation, e.g. heat activation.

In a preferred embodiment, the two-component system according to the invention does not contain any blowing agent. Examples of such blowing agents which are preferably not contained include chemical blowing agents (e.g., those agents that provide for material expansion via a chemical reaction) including but not limited to azodicarbonamide, dinitrosopentamethylenetetramine, hydrazides such as 4,4-oxy-bis-(benzene-sulphonylhydrazide), trihydrazinotriazine, N,N'-dimethyl-N,N'-dinitrosoterephthalamide, toluenesulfonyl hydrazide (TSH), p-toluenesulfonyl semicathazide (TSSC), 5-phenyl tetrazole (5-PT), or N—N'-dinitrosopentamethylene tetramine (DNPT). Examples of such blowing agents which are preferably not contained include physical blowing agent, wherein material expansion occurs via a phase change mechanism. Physical blowing agents like Expancel, sold by Akzo Nobel, Sundsvall, Sweden, comprise a volatile liquid trapped in a thermoplastic shell. When they are heated, the shell softens and the liquid boils. This is the physical transformation (from a liquid to a gas) that gives this type of blowing agent its name. When the volatile liquid becomes a gas it causes the softened shell to stretch/expand. The gas is generated but it is not released from the shell.

In preferred embodiments, the two-component system comprises neither red phosphorus (e.g. CAS 7723-14-0) nor zinc borate (e.g. CAS 1332-07-6) nor sulfuric acid (e.g. 7664-93-9) nor nickel (e.g. CAS 7440-02-0) nor diantimony trioxide (e.g. CAS 1309-64-4).

Preferably, the relative weight ratio of the first component to the second component is within the range of from 20:1 to 1:1; preferably from 15:1 to 1:1; more preferably from 10:1 to 1:1; still more preferably from 5:1 to 1:1; yet more preferably from 3:1 to 1:1; most preferably from 2.5:1 to 1.5:1.

Preferably, the two-component system according to the invention provides a work life at 23° C. in a static mixer within the range of 30±25 minutes; preferably 30±20 minutes; more preferably 30±15 minutes, still more preferably 30±10 minutes; most preferably 30±5.0 minutes.

Preferably, the two-component system according to the invention provides full cure at 23° C. within the range of 24±20 h; preferably 24±12 h; more preferably 24±6 h.

Preferably, the two-component system according to the invention provides a sanding time at 23° C. within the range of 3.0±2.5 h; preferably 3.0±2.0 h; more preferably 3.0±1.5 h.

In a preferred embodiment, the two-component system has a post-cure glass transition temperature that is greater than any temperatures to which the two-component system may be exposed while in its intended environment of use (e.g. in an airplane or automotive vehicle). Exemplary post-cure glass transition temperatures may be at least 80° C. and more preferably at least 100° C. Other desired characteristics of the two-component system might include good adhesion retention and degradation resistance particularly in adverse environments such as highly variable temperature environments, high dynamic activity environments, combinations thereof or the like.

Preferably, the cured material has a specific gravity (cured density) of at most 0.600 $g \cdot cm^{-3}$, more preferably of at most 0.590 $g \cdot cm^{-3}$, still more preferably of at most 0.580 $g \cdot cm^{-3}$, even more preferably of at most 0.570 $g \cdot cm^{-3}$, yet more preferably of at most 0.560 $g \cdot cm^{-3}$ and in particular of at most 0.550 $g \cdot cm^{-3}$; in each case determined according to EN ISO 1183.

Preferably, the cured material has a specific gravity within the range of 0.54±0.25 $g \cdot cm^{-3}$; preferably 0.54±0.20 $g \cdot cm^{-3}$; more preferably 0.54±0.15 $g \cdot cm^{-3}$; still more preferably 0.54±0.10 $g \cdot cm^{-3}$; most preferably 0.54±0.05 $g \cdot cm^{-3}$; in each case determined according to EN ISO 1183.

Preferably, the cured material has a compressive strength at −55° C. of at least 10 MPa; more preferably at least 15 MPa, still more preferably at least 20 MPa; most preferably at least 25 MPa; in each case determined according to ISO 604. Alternatively, compressive strength may be determined in accordance with ASTM D695.

Preferably, the cured material has a compressive strength at −55° C. of 26±20 MPa; preferably 26±15 MPa; more preferably 26±10 MPa; most preferably 26±5 MPa; in each case determined according to ISO 604.

Preferably, the cured material has a compressive strength at 23° C. of at least 5.0 MPa; more preferably at least 7.5 MPa; still more preferably at least 10 MPa; most preferably at least 12.5 MPa; in each case determined according to ISO 604.

Preferably, the cured material has a compressive strength at 23° C. of 13±10 MPa; preferably 13±8 MPa; more preferably 13±6 MPa; most preferably 13±3 MPa; in each case determined according to ISO 604.

Preferably, the cured material has a compressive strength at 80° C. of at least 1.0 MPa; more preferably at least 2.5 MPa; still more preferably at least 5.0 MPa; in each case determined according to ISO 604.

Preferably, the cured material has a compressive strength at 80° C. of 6.0±5.0 MPa; preferably 6.0±4.0 MPa; more preferably 6.0±3.0 MPa; most preferably 6.0±2.0 MPa; in each case determined according to ISO 604.

Preferably, the cured material has a compressive modulus at 23° C. of at least 100 MPa; more preferably at least 200 MPa; still more preferably at least 300 MPa; most preferably at least 400 MPa; in each case determined according to ISO 604. Alternatively, compressive modulus may be determined in accordance with ASTM D695.

Preferably, the cured material has a compressive modulus at 23° C. of 500±400 MPa; preferably 500±300 MPa; more preferably 500±200 MPa; most preferably 500±100 MPa; in each case determined according to ISO 604.

Preferably, the two-component system of the invention, in a cured state passes one or any combination of the 12 seconds Vertical Burn test per 14 C.F.R. § 25.853 App. F Part I (a)(1)(ii); 60 seconds Vertical Burn test per 14 C.F.R. § 25.853 App. F Part 1(a)(1)(i); Smoke Density per 14 C.F.R. § 25.853 App. F Part V, or Smoke Toxicity per AITM 3.0005.

The two-component system according to the invention exhibits excellent fire retardancy, especially flame retardancy, smoke density (smoke opacity) and smoke toxicity.

Preferably, the cured material after 60 seconds at a 6.3 mm sample thickness exhibits in the vertical burn test in accordance with FAR 25 Appendix F Part 1 (a)(1)(ii)/AITM 2.0002 B, a maximum burn length of at most 150 mm; preferably at most 140 mm; still more preferably at most 130 mm; yet more preferably at most 120 mm; most preferably at most 110 mm.

Preferably, the cured material after 60 seconds at a 6.3 mm sample thickness exhibits in the vertical burn test in accordance with FAR 25 Appendix F Part 1 (a)(1)(i)/AITM 2.0002 A, an after flame time of at most 15 seconds; preferably at most 12 seconds; still more preferably at most 9.0 seconds; yet more preferably at most 6.0 seconds; most preferably at most 3.0 seconds.

Preferably, the cured material after 60 seconds at a 6.3 mm sample thickness exhibits in the vertical burn test in accordance with FAR 25 Appendix F Part 1 (a)(1)(i)/AITM 2.0002 A, a dripping time (drips exting time) of at most 3.0 seconds; preferably at most 2.5 seconds; still more preferably at most 2.0 seconds; yet more preferably at most 1.5 seconds; most preferably at most 1.0 seconds.

Preferably, the cured material at a 6.3 mm sample thickness provides an optical smoke density DS of at most 200; preferably at most 180; more preferably at most 160; still more preferably at most 140; most preferably at most 120; in each case determined in accordance with JAR/FAR 25.853 AITM 2.0007 A flaming modes.

In preferred embodiments, the cured material at a 6.3 mm sample thickness exhibits a smoke toxicity in accordance with AITM 3.0005

- with regard to HF of at most 10 ppm; preferably at most 8 ppm; more preferably at most 6 ppm; still more preferably at most 4 ppm; most preferably at most 2 ppm; and/or
- with regard to HCl of at most 10 ppm; preferably at most 8 ppm; more preferably at most 6 ppm; still more preferably at most 4 ppm; most preferably at most 2 ppm; and/or
- with regard to HCN of at most 20 ppm; preferably at most 18 ppm; more preferably at most 16 ppm; still more preferably at most 14 ppm; most preferably at most 12 ppm; and/or
- with regard to $SO_2$+$H_2S$ of at most 10 ppm; preferably at most 8 ppm; more preferably at most 6 ppm; still more preferably at most 4 ppm; most preferably at most 2 ppm; and/or
- with regard to CO of at most 300 ppm; preferably at most 250 ppm; more preferably at most 200 ppm; still more preferably at most 175 ppm; most preferably at most 150 ppm; and/or
- with regard to NO+$NO_2$ of at most 90 ppm; preferably at most 95 ppm; most preferably at most 90 ppm.

Preferably, during activation by mixing the first component with the second component, the two-component system according to the invention preferably exhibits no exudation. During activation, the two-component system according to the invention preferably has a volatile content of not more than 3.5%, more preferably not more than 3.0%, still more preferably not more than 2.5%, yet more preferably not more than 2.0%, even more preferably not more than 1.5%, most preferably not more than 1.0%, and in particular not more than 0.5%, in each case when being tested in accordance with DIN 65064 Section 6.1.3.1.

During activation by mixing, the two-component system according to the invention preferably has an exothermicity of less than 25° C., more preferably at most 23° C., still more preferably at most 21° C., yet more preferably at most 19° C., even more preferably at most 17° C., most preferably at most 15° C., and in particular at most 13° C. in each case when being tested in accordance with DIN 65064 Section 6.1.3.2

Another aspect of the invention relates to the use of a two-component system according to the invention as described above as structural void filling compound; preferably for interior honeycomb sandwich structures as edge close-out, corner reinforcement, local reinforcement for mechanical fixation, or complex gap filling.

The use may have the purpose of reinforcing a sandwich structure, preferably a honeycomb structure.

The two-component system may be used as core or edge filling of a sandwich structure, preferably of a honeycomb sandwich structure; preferably as an insert or edge filling of a honeycomb sandwich structure, i.e. on interior honeycomb sandwich structures as edge close-out, corner reinforcement, local reinforcement for mechanical fixation, complex gap or mismatch area filling, and the like. It is particularly useful to reinforce honeycomb sandwich structures, especially at locations for mechanical fixation where it is intended to drill holes or make mechanical attachments to other parts e.g. by means of screws and the like.

Preferably, the two-component system according to the invention is ready-to-use. The two-component system according to the invention is a low density, structural void filling material that is typically extrudable or pumpable. It is designed for use as an insert or edge filling of honeycomb structures, i.e. on interior honeycomb sandwich structures as edge close-out, corner reinforcement, local reinforcement for mechanical fixation, complex gap or mismatch area filling, and the like. It is particularly useful to reinforce honeycomb sandwich structures, especially at locations for mechanical fixation where it is intended to drill holes or make mechanical attachments to other parts e.g. by means of screws and the like. Preferably, the two-component system according to the invention is flexible and can be readily processed prior to curing and forms a rigid material upon curing.

Another aspect of the invention relates to a cartridge for a dispensing system, wherein the cartridge has a first chamber containing the first component according to the invention as defined above and a second chamber containing the second component according to the invention as defined above.

Another aspect of the invention relates to a method for filling voids or edges of a honeycomb sandwich structure comprising the steps of (a) mixing the first component according to the invention as described above and the second component according to the invention as described above with one another thereby providing a combined first component and the second component;

(b) applying the combined first component and the second component obtained in step (a) into a void or to an edge of a honeycomb sandwich structure; and (c) allowing the combined first component and the second component to cure thereby providing a cured material within the void or at the edge of the honeycomb sandwich structure.

The method according to the invention may have the purpose of reinforcing a honeycomb sandwich structure.

Step (b) of the method according to the invention preferably involves pumping or troweling the two-component system into the void or edge. The two-component system according to the invention is pumped or troweled into one or more of the plurality of openings of the honeycomb sandwich structure (voids or edges) thereby providing reinforcement to the honeycomb sandwich structure. The two-component system according to the invention is preferably neither provided in form of a coating or film, nor is it used to for preparing a coating or film, i.e. a thin layer of material, to a given surface.

The two-component system when being applied may still be in pumpable form. The composition may be applied within the interstices of a honeycomb sandwich structure (e.g., a non-metallic honeycomb form, such as a core of a sandwich laminate) The composition may be applied along one or more side edges of a honeycomb sandwich structure.

Further, step (b) of the method according to the invention may optionally involve compressing the two-component system within the void or edge that receives the composition.

In step (c) of the method according to the invention, the combined first component and the second component are allowed to cure thereby providing a cured material within the void or at the edge of the honeycomb sandwich structure. Preferably, the curing is essentially completed within not more than 2 hours, preferably not more than 1 hour, more preferably not more than 30 minutes. For example, the teachings may employ a step of allowing the composition to stand for a sufficient amount of time so that substantially homogeneous curing of the composition occurs substantially throughout the composition.

It is additionally contemplated that other additional or alternative techniques may be used to process the panel structure. Such techniques can include vacuum forming and baking, autoclaving and pressure, others or combinations thereof. Such techniques can assist in forming panels with contours. Time period for these techniques can be the same as those discussing above or may be different depending upon the material used.

For allowing application of the two-component system according to the aforementioned protocols, particularly the manual applications, although the automated and applicator techniques may be used as well, it is preferably desirable for the two-component system to exhibit certain desirable properties. As suggested, it is generally desirable for the two-component system, prior to curing, to be generally flexible or ductile. After curing of the two-component system, it is preferable, although not required, for the cured material to have relatively high strength.

The teachings herein find application in the transportation industry (e.g., for use in automotive vehicles, aircraft, railcars, or otherwise), in the construction industry (e.g., as wall panels), or elsewhere. Articles made using the compositions of the teachings herein are also envisioned within the scope of the teachings. Examples of such articles include, without limitation, potted structures, panels with an edge close-out, locally reinforced structures (such as a locally reinforced panel), a core-spliced body (e.g., a spliced honeycomb structural panel). The articles may be panels (e.g., ceiling and/or side walls), partitions, cargo and/or baggage compartments, or the like. Any of the foregoing may include a honeycomb structure that defines a plurality of voids into which the composition of the present teaching is inserted.

It is contemplated that the honeycomb sandwich structure may be derived from a variety of articles. Exemplary articles include household or industrial appliance (e.g., dishwashers, washing machines, dryers or the like), furniture, storage containers or the like. In a preferred embodiment, the honeycomb sandwich structure is employed in a transportation vehicle (e.g., an automotive vehicle, a boat, an airplane or the like). When used for a transportation vehicle, the panel structure has been found to be particularly useful panel structure of an aerospace vehicle (e.g., an airplane). As such, the panel structure of the present invention is primarily discussed in relation to an airplane, however, the invention should not be so limited unless otherwise stated.

The facing sheet of the honeycomb sandwich structure may be formed of a variety of materials. Exemplary materials include metals, polymeric materials (e.g., plastics, elastomers, thermoplastics, thermosets, combinations thereof or the like). The materials of the honeycomb panels may also be reinforced with minerals, fibrous materials (e.g., glass, carbon or nylon fibers), combinations thereof or the like. In a preferred embodiment, one facing sheet is formed of fiberglass/plastic composite and another is formed of a metal or metal alloy.

Another aspect of the invention relates to a cured composition obtained by curing the two-component system according to the invention as described above.

Another aspect of the invention relates to a honeycomb structure comprising the two-component system according to the invention as described, either in its reactive state or in its cured state.

The two-component system according to the invention may be made by any suitable method. Preferably, liquid ingredients are mixed first together, then fillers are added one by one and mixed.

Mixing is performed under conditions that impart relatively low shear forces to the admixed ingredients. It is possible that a planetary mixer may be employed for any of the mixing steps. Mixing proceeds until all ingredients appear to be substantially homogeneously mixed. Mixing may proceed in a plurality of relatively brief intervals (e.g., 5 to 30 seconds, such as 10 to 15 seconds), or at some other interval.

EXAMPLES

The following examples further illustrate the invention but are not to be construed as limiting its scope.

Example 1

A two-component system having the following ingredients is prepared by separately mixing the ingredients of each component. The two-components are then filled into a 400 ml 2:1 dual cartridge (Mixpac™ Blueline System, Sulzer Winterthur Switzerland):

| | | [wt.-%] | |
|---|---|---|---|
| | | 1st | 1st + 2nd |
| 1st component | epoxy resins | 65 | 44 |
| 2 parts by weight | ammonium polyphosphate flame retardant | 9 | 6 |
| | alumina trihydrate flame retardant and smoke suppressor | 18 | 12 |
| | low density plastic microspheres | 3 | 2 |
| | coloring agents and wetting/dispersing/anti-foaming agents | 5 | 3 |
| | | 100 | 67 |
| | | 2nd | 1st + 2nd |
| 2nd component | modified amine curing agents | 46 | 15 |
| 1 part by weight | amine based catalyst | 5 | 2 |
| | alumina trihydrate flame retardant and smoke suppressor | 42 | 13 |
| | low density plastic microspheres | 3 | 1 |
| | coloring agents and wetting/dispersing/anti-foaming agents | 4 | 2 |
| | | 100 | 33 |
| | | | 100.00 |

Example 2

A two-component system having the following ingredients is prepared by separately mixing the ingredients of each component. The two-components are then filled into a 400 ml 2:1 dual cartridge (Mixpac™ Blueline System, Sulzer Winterthur Switzerland):

| | | [wt.-%] | |
|---|---|---|---|
| | | 1st | 1st + 2nd |
| 1st component | epoxy resin | 22 | 15 |
| 2 parts by weight | epoxy phenol novolac resin | 43 | 29 |
| | ammonium polyphosphate flame retardant | 7 | 5 |
| | alumina trihydrate flame retardant and smoke suppressor | 20 | 13 |

-continued

| | | [wt.-%] | |
|---|---|---|---|
| | low density plastic microspheres | 3 | 2 |
| | coloring agents and wetting/dispersing/anti-foaming agents | 5 | 3 |
| | | 100 | 67 |
| | | 2nd | 1st + 2nd |
| 2nd component | first modified amine curing agent | 19 | 7 |
| 1 part by weight | second modified amine curing agent | 27 | 9 |
| | amine based catalyst | 5 | 2 |
| | alumina trihydrate flame retardant and smoke suppressor | 44 | 14 |
| | low density plastic microspheres | 3 | 1 |
| | coloring agents and wetting/dispersing/anti-foaming agents | 2 | 1 |
| | | 100 | 33 |
| | | | 100 |

Example 3

A two-component system having the following ingredients is prepared by separately mixing the ingredients of each component. The two-components are then filled into a 400 ml 2:1 dual cartridge (Mixpac™ Blueline System, Sulzer Winterthur Switzerland):

| | | [wt.-%] | |
|---|---|---|---|
| | | 1st | 1st + 2nd |
| 1st component | epoxy resin | 22 | 15 |
| 2 parts by weight | epoxy phenol novolac resin | 43 | 29 |
| | ammonium polyphosphate flame retardant | 8 | 5 |
| | alumina trihydrate flame retardant and smoke suppressor | 19 | 13 |
| | low density plastic microspheres | 3 | 2 |
| | coloring agents and wetting/dispersing/anti-foaming agents | 5 | 3 |
| | | 100 | 67 |
| | | 2nd | 1st + 2nd |
| 2nd component | first modified amine curing agent | 19 | 7 |
| 1 part by weight | second modified amine curing agent | 27 | 9 |
| | amine based catalyst | 5 | 2 |
| | alumina trihydrate flame retardant and smoke suppressor | 44 | 14 |
| | low density plastic microspheres | 3 | 1 |
| | coloring agents and wetting/dispersing/anti-foaming agents | 2 | 1 |
| | | 100 | 33 |
| | | | 100 |

Example 4

A two-component system having the following ingredients is prepared by separately mixing the ingredients of each component. The two-components are then filled into a 400 ml 2:1 dual cartridge (Mixpac™ Blueline System, Sulzer Winterthur Switzerland):

| | | [wt.-%] | |
|---|---|---|---|
| | | 1st | 1st + 2nd |
| 1st component | epoxy resins | 63 | 42 |
| 2 parts by weight | ammonium polyphosphate flame retardant | 8 | 5 |
| | alumina trihydrate flame retardant and smoke suppressor | 21 | 14 |

-continued

| | | [wt.-%] | |
|---|---|---|---|
| | low density plastic microspheres | 3 | 2 |
| | coloring agents and wetting/dispersing/anti-foaming agents | 5 | 3 |
| | | 100 | 67 |
| | | 2nd | 1st + 2nd |
| 2nd component | modified amine curing agents | 46 | 15 |
| 1 part by weight | amine based catalyst | 5 | 2 |
| | alumina trihydrate flame retardant and smoke suppressor | 44 | 14 |
| | low density plastic microspheres | 3 | 1 |
| | coloring agents and wetting/dispersing/anti-foaming agents | 2 | 1 |
| | | 100 | 33 |
| | | | 100 |

Example 5

Representative properties of an uncured and cured material obtained from the two-component system according to the invention were determined and compared to that of a conventional commercial two-component system. These properties are compared in the following table:

| | comparative | inventive |
|---|---|---|
| consistency first component | thixotropic paste | smooth paste |
| consistency second component | thixotropic paste | smooth paste |
| solid contents first component | 100% | 99% |
| solid contents second component | 100% | 99% |
| uncured specific gravity first component | 0.56 g · cm$^{-3}$ | 0.54 g · cm$^{-3}$ |
| uncured specific gravity second component | 0.58 g · cm$^{-3}$ | 0.54 g · cm$^{-3}$ |
| weight mix ratio first: second component | 100:52 | 100:50 |
| volume mix ratio first: second component | 100:50 | 100:50 |
| work life at 23° C. (static mixer) | at least 2 hours | 30 minutes |
| full cure at 23° C. | 48 h | 24 h |
| volatile loss on cure | <0.1% | ~0% |
| sanding time | 12 h | 3 h |
| cured specific gravity | 0.57 g · cm$^{-3}$ | 0.54 g · cm$^{-3}$ |
| compressive strength (EN ISO 604) @ −55° C. | 30 MPa | 26 MPa |
| compressive strength (EN ISO 604) @ 23° C. | 27 MPa | 13 MPa |
| compressive strength (EN ISO 604) @ 80° C. | 5 MPa | 5.8 MPa |
| compressive strength (EN ISO 604) @ 23° C. after immersion in distilled water @ 23° C. | — | 11 MPa |
| compressive strength (EN ISO 604) @ 23° C. after 1000 h wet aging (85% RH, 70° C.) | — | 13 MPa |
| compressive strength (EN ISO 604) @ 23° C. after 500 h @ 85° C. | — | 19 MPa |
| compressive modulus (EN ISO 604) @ 23° C. | 1200 MPa | 500 MPa |
| fluid absorption (EN ISO 62) after immersion in distilled water @ 23° C. | — | 2.5 wt.-% |
| fluid absorption (EN ISO 62) after 1000 h wet aging (85% RH, 70° C.) | — | 2.5 wt.-% |
| vertical burn 12 s 6,3 mm burn length | 3 mm | 6 mm |
| vertical burn 12 s 6,3 mm after flame time | 0 s | 1 s |
| vertical burn 12 s 6,3 mm dripping time | 0 s | 0 s |
| vertical burn 60 s 6.3 mm burn length | 12 mm | 101 mm |
| vertical burn 60 s 6.3 mm after flame time | 0 s | 1 s |
| vertical burn 60 s 6.3 mm dripping time | 0 s | 0 s |
| smoke density 6.3 mm | 162 | <100 |
| smoke toxicity 6.3 mm HF | <1 ppm | 0 ppm |
| smoke toxicity 6.3 mm HCl | <1 ppm | 0 ppm |
| smoke toxicity 6.3 mm HCN | 33 ppm | 10 ppm |
| smoke toxicity 6.3 mm $SO_2 + H_2S$ | <1 ppm | 1 ppm |
| smoke toxicity 6.3 mm CO | 450 ppm | 155 ppm |
| smoke toxicity 6.3 mm $NO + NO_2$ | 9 ppm | 88 ppm |

It can be concluded from the above comparative data that the two-component system according to the invention—in comparison to the conventional commercial two-component system—has a lower density; has satisfactory and comparable mechanical properties with an improved compressive strength at 80° C.; has a better smoke density; can be used faster with respect to curing time and sanding time; and has a significantly improved HSE profile.

The invention claimed is:

1. A two-component system of a (i) first component comprising one or more curable polymers; and (ii) a second component comprising one or more curing agents for the one or more curable polymers;

wherein the first component and the second component each comprise low density polymeric microspheres in an amount of 3 wt % or less and at a relative weight ratio of about 2:1 (first component: second component) so that the each of the first and second component has a viscosity of 50 to 300 Pa·s as measured in accordance with ASTM D445 for in-use storage stability in a two-chamber cartridge; and wherein at least one of the first and second component comprise:

an ammonium polyphosphate; or a metal hydroxide;

wherein the first component and the second component are spatially separated from one another;

wherein the reaction of the first component and the second component at 23° C. after mixing with one another results in a cured material; and wherein the cured material has a cured density of at most 0.550 g/cm$^{-3}$ as determined according to EN ISO 1183.

2. The two-component system according to claim 1, wherein the first component and the second component both are extrudable through cartridge systems or dispensing systems.

3. The two-component system according to claim 1, wherein the first component and the second component independently of one another both have a density within the range of 0.54±0.05 g·cm$^{-3}$ determined according to EN ISO 1183.

4. The two-component system according to claim 3, wherein the one or more curable polymers of the first component comprise a liquid bisphenol diglycidylether.

5. The two-component system according to claim 4, wherein the liquid epoxy resin has an epoxy equivalent weight within the range of from 160 to 215 g/eq determined according to ASTM D1652.

6. The two-component system according to claim 4, wherein the content of the liquid epoxy resin is within the range of 15±10 wt.-%-relative to the total weight of the two-component system.

7. The two-component system according to claim 4, wherein the one or more curable polymers of the first component comprise an epoxy phenol novolac resin.

8. The two-component system according to claim 7, wherein the epoxy phenol novolac resin has an epoxy equivalent weight within the range of from 145 to 200 g/eq determined according to ASTM D1652.

9. The two-component system according to claim 7, wherein the content of the epoxy phenol novolac resin is within the range of 30±5.0 wt.-%-relative to the total weight of the two-component system.

10. The two-component system according to claim 7, wherein the one or more curing agents for the curable polymer of the second component comprise or essentially consist of one or more curing agents for curable epoxy resins.

11. The two-component system according to claim 7, wherein the total content of the one or more curing agents of the second component is at least about 12 wt.-% at most about 24 wt.-%; and/or within the range of about 15±5.0 wt.-%;

in each case relative to the total weight of the two-component system.

12. The two-component system according to claim 7, wherein the one or more curing agents of the second component comprise a polyamidoimidazoline curing agent.

13. The two-component system according to claim 1, wherein the relative difference of the density of first component and the density of the second component is at most ±0.05 g·cm$^{-3}$; determined according to EN ISO 1183.

14. The two-component system according to claim 1, wherein the two-component system does not contain blowing agents.

15. The two-component system according to claim 1, wherein the two-component system is not volume expandable upon activation.

16. The two-component system according to claim 1, wherein the total content of the one or more curable polymers of the first component is within the range of 45±30 wt.-% relative to the total weight of the two-component system.

17. The two-component system according to claim 1, wherein the one or more curable polymers of the first component comprise or essentially consist of one or more curable epoxy resins.

18. The two-component system according to claim 1, wherein the one or more curing agents of the second component comprise one or more amines selected from the group consisting of (i) aliphatic amines selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino) propylamine, diethylenetriamine, triethylenetetramine, pentaethylenehexamine, trimethylhexamethylenediamine, 2-methylpentanediamine, hexamethylenediamine, N-(2-aminoethyl)ethane-1,2-diamine, N-(3-aminopropyl)propane-1,3-diamine, N,N"-1,2-ethanediylbis(1,3-propanediamine), dipropylenetriamine, adipic dihydrazide, and hydrazine;

(ii) cycloaliphatic amines selected from isophorone diamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, 3,3'-dimethyl-4,4'-diaminodicyclohexylmethane, N-cyclohexyl-1,3-propanediamine, 1,2-diaminocyclohexane, piperazine, N-aminoethylpiperazine, TCD diamine (3(4),8(9)-bis (aminomethyl) tricyclo[5.2.1.02,6]decane), and 4-methylcyclohexane-1,3-diamine;

(iii) polyamidoamines which are obtained by condensation of a polyamine with a mono- and/or polycarboxylic acid;

(iv) mannich bases which are obtained by reaction of a mono- and/or polyhydric phenol with an aldehyde and a polyamine;

(v) aromatic amines selected from phenylene-1,3-diamine, phenylene-1,4-diamine, 4,4'-diaminodiphenylmethane, 2,4'-diaminodiphenylmethane, and 2,2'-diaminodiphenylmethane;

and mixtures thereof.

* * * * *